US011396902B2

(12) United States Patent
Davis

(10) Patent No.: US 11,396,902 B2
(45) Date of Patent: Jul. 26, 2022

(54) ENGAGING WASHERS

(71) Applicant: The Reaction Washer Company, LLC, Springville, UT (US)

(72) Inventor: John D. Davis, Herriman, UT (US)

(73) Assignee: THE REACTION WASHER COMPANY, LLC, Springville, UT (US)

( * ) Notice: Subject to any disclaimer, the term of this patent is extended or adjusted under 35 U.S.C. 154(b) by 218 days.

(21) Appl. No.: 16/447,660

(22) Filed: Jun. 20, 2019

(65) Prior Publication Data

US 2020/0400184 A1 Dec. 24, 2020

(51) Int. Cl.
*F16B 39/24* (2006.01)
*B25B 23/00* (2006.01)
*B25B 21/00* (2006.01)

(52) U.S. Cl.
CPC .............. *F16B 39/24* (2013.01); *B25B 21/00* (2013.01); *B25B 23/0035* (2013.01)

(58) Field of Classification Search
CPC .......... F16B 39/08; F16B 39/10; F16B 39/24; F16B 43/00; B25B 21/00; B25B 23/0035
USPC .................... 411/204, 205, 531, 533–534
See application file for complete search history.

(56) References Cited

U.S. PATENT DOCUMENTS

| 605,788 | A | * | 6/1898 | Johnson ................. F16B 39/24 411/158 |
| 625,529 | A | | 5/1899 | Andress |
| 910,712 | A | | 1/1909 | McCoy |
| 1,099,410 | A | * | 6/1914 | Walker .................. F16B 39/108 411/123 |
| 1,101,461 | A | * | 6/1914 | Maynard ................. F16B 39/32 411/330 |

(Continued)

FOREIGN PATENT DOCUMENTS

| CN | 2241793 Y | 12/1996 |
| CN | 105269504 A | 1/2016 |

(Continued)

OTHER PUBLICATIONS

International Search Report and Written Opinion dated Aug. 12, 2020 for corresponding PCT Application No. PCT/US2020/034890.

(Continued)

*Primary Examiner* — Roberta S Delisle
(74) *Attorney, Agent, or Firm* — Jacob Ong; Ongs Law Firm PLLC

(57) ABSTRACT

Engaging washers such as reaction washers and backup washers can include novel advantageous features. For example, an engaging washer can include an inner row of teeth and an outer row of teeth, where the teeth in the inner row can slope in a first circumferential direction to primarily engage a flange during bolt tightening, and the teeth in the outer row can slope in a second circumferential direction to primarily engage during bolt loosening. The engaging washers may also include an arched design to allow gradual increasing of contact surface areas as a clamping force in the washer gradually increases. Additionally, a reaction washer can include stepped castles for engaging a reaction socket. The castles may also include sloped or curved engaging surfaces that can provide decreased contact surface area and may also inhibit outward biasing of reaction fingers that are engaging the castles.

13 Claims, 12 Drawing Sheets

(56) References Cited

U.S. PATENT DOCUMENTS

| | | |
|---|---|---|
| 1,911,384 A | 5/1933 | Olson |
| 2,271,732 A | 2/1942 | Chappius |
| 2,272,118 A * | 2/1942 | Imse .................. F16C 23/045 |
| | | 384/206 |
| 3,077,218 A | 2/1963 | Ernst |
| 3,181,584 A | 5/1965 | Gordon |
| 3,260,293 A | 7/1966 | Gohs |
| 3,263,727 A | 8/1966 | Herpolsheimer |
| 3,332,464 A | 7/1967 | Castel |
| 3,417,802 A | 12/1968 | Oldenkott |
| 3,541,844 A | 11/1970 | Stover |
| 3,581,383 A | 6/1971 | Tadahira et al. |
| 3,631,910 A | 1/1972 | Crowther et al. |
| 3,633,446 A | 1/1972 | Tadahira et al. |
| 3,705,612 A | 12/1972 | Comley |
| 3,759,119 A | 9/1973 | Wing |
| 3,895,663 A | 7/1975 | Bashline et al. |
| 3,926,237 A | 12/1975 | Enders |
| 4,039,354 A | 8/1977 | Schober |
| 4,283,091 A | 8/1981 | Enders |
| 4,538,313 A | 9/1985 | Frieberg |
| 4,708,555 A | 11/1987 | Terry |
| 5,011,351 A | 4/1991 | Terry |
| 5,080,545 A | 1/1992 | McKinlay |
| 5,318,397 A | 6/1994 | Junkers |
| 5,341,560 A | 8/1994 | Junkers |
| 5,499,558 A | 3/1996 | Junkers |
| 5,533,849 A | 7/1996 | Burdick |
| 5,538,379 A | 7/1996 | Junkers |
| 5,539,970 A | 7/1996 | Junkers |
| 5,626,449 A | 5/1997 | Mckinlay |
| 5,640,749 A | 6/1997 | Junkers |
| 5,688,091 A | 11/1997 | McKinlay |
| 5,829,933 A | 11/1998 | Kramer |
| 5,946,789 A | 9/1999 | Junkers |
| 6,039,524 A | 3/2000 | McKinlay |
| 6,152,243 A | 11/2000 | Junkers |
| 6,230,589 B1 | 5/2001 | Junkers |
| 6,254,323 B1 | 7/2001 | Junkers |
| 6,461,093 B1 | 10/2002 | Junkers |
| 6,490,952 B2 | 12/2002 | Junkers |
| 6,609,868 B2 | 8/2003 | Junkers |
| 6,776,565 B2 | 8/2004 | Chang |
| 6,883,401 B2 | 4/2005 | Junkers |
| 6,896,465 B2 | 5/2005 | Andersson |
| 6,929,439 B2 | 8/2005 | Junkers |
| 6,986,298 B2 | 1/2006 | Junkers |
| 7,003,862 B2 | 2/2006 | Junkers |
| 7,066,053 B2 | 6/2006 | Junkers |
| 7,125,213 B2 | 10/2006 | Junkers |
| 7,168,902 B2 | 1/2007 | Terry |
| 7,188,552 B1 | 3/2007 | Koppenhoefer |
| 7,207,760 B2 | 4/2007 | Junkers |
| 7,246,542 B2 | 7/2007 | Karol |
| 7,261,506 B2 | 8/2007 | Smolarek |
| 7,306,170 B1 | 12/2007 | Maksymec |
| 7,462,007 B2 | 12/2008 | Sullivan et al. |
| D602,349 S | 10/2009 | Andersson |
| 7,735,397 B2 | 6/2010 | Junkers |
| 7,950,309 B2 | 5/2011 | Junkers et al. |
| 8,033,000 B2 | 10/2011 | Hohmann et al. |
| 8,403,611 B2 * | 3/2013 | Friesen .................. F16B 39/32 |
| | | 411/197 |
| 8,459,919 B2 | 6/2013 | Ehrler et al. |
| 8,591,157 B1 | 11/2013 | Stewart et al. |
| 8,631,724 B2 | 1/2014 | Miyata |
| 8,978,520 B2 | 3/2015 | Yoshimachi et al. |
| 9,011,060 B2 | 4/2015 | Hyatt |
| 9,770,815 B2 | 9/2017 | Scrivens |
| 10,107,325 B2 | 10/2018 | Davis et al. |
| 2002/0146299 A1 | 10/2002 | Hewgill |
| 2003/0077143 A1 | 4/2003 | Smolarek |
| 2003/0190218 A1 * | 10/2003 | Andersson ............ F16B 39/282 |
| | | 411/533 |
| 2004/0047706 A1 | 3/2004 | Chang |
| 2004/0197160 A1 | 10/2004 | Junkers |
| 2006/0013670 A1 | 1/2006 | Sullivan et al. |
| 2007/0098524 A1 | 5/2007 | Dunlap et al. |
| 2007/0104552 A1 | 5/2007 | Hewgill |
| 2007/0128003 A1 * | 6/2007 | Shiu ...................... F16B 39/282 |
| | | 411/533 |
| 2007/0243040 A1 | 10/2007 | Chen |
| 2007/0251359 A1 | 11/2007 | Junkers et al. |
| 2007/0280802 A1 | 12/2007 | Disantis et al. |
| 2009/0003960 A1 | 1/2009 | Lin |
| 2010/0239390 A1 | 9/2010 | Junkers |
| 2011/0220376 A1 | 9/2011 | Junkers |
| 2012/0125163 A1 | 5/2012 | Miyata |
| 2013/0180369 A1 | 7/2013 | Dolan |
| 2013/0202384 A1 | 8/2013 | Dolan |
| 2014/0377032 A1 | 12/2014 | Delcher |
| 2016/0003287 A1 * | 1/2016 | Andersson ............... F16B 39/24 |
| | | 411/149 |
| 2016/0067849 A1 | 3/2016 | Junkers et al. |
| 2016/0375563 A1 | 12/2016 | Junkers et al. |
| 2017/0021478 A1 | 1/2017 | Junkers et al. |
| 2017/0122361 A1 | 5/2017 | Davis et al. |
| 2018/0209469 A1 | 7/2018 | Dolan |
| 2018/0339377 A1 | 11/2018 | Schneeberger et al. |
| 2018/0340567 A1 | 11/2018 | Schneeberger |
| 2019/0003512 A1 * | 1/2019 | Junkers ............... B25B 23/1415 |
| 2019/0003513 A1 * | 1/2019 | Junkers ............... B25B 23/1415 |
| 2019/0120275 A1 * | 4/2019 | Junkers ............... B25B 23/0078 |
| 2019/0136902 A1 | 5/2019 | Davis et al. |
| 2019/0178282 A1 | 6/2019 | Davis et al. |
| 2019/0178283 A1 | 6/2019 | Davis et al. |
| 2019/0178284 A1 | 6/2019 | Davis et al. |
| 2020/0166071 A1 | 5/2020 | Schneeberger |
| 2020/0386263 A1 | 12/2020 | Davis et al. |
| 2021/0095710 A1 | 4/2021 | Junkers et al. |

FOREIGN PATENT DOCUMENTS

| | | |
|---|---|---|
| EP | 1855018 A2 | 11/2007 |
| ES | 423660 A1 | 4/1976 |
| GB | 514923 A | 11/1939 |
| JP | 2006307965 A | 11/2006 |
| WO | 2004033139 A2 | 4/2004 |
| WO | 2004033139 A3 | 3/2005 |
| WO | 2014015250 A1 | 1/2014 |
| WO | 2015095425 A2 | 6/2015 |
| WO | 2015100115 A2 | 7/2015 |
| WO | 2015109355 A1 | 7/2015 |
| WO | WO2015152728 | 10/2015 |
| WO | 2015095425 A3 | 11/2015 |
| WO | 2016176518 A3 | 12/2016 |
| WO | 2017079685 A1 | 5/2017 |
| WO | 2018218209 A1 | 11/2018 |

OTHER PUBLICATIONS

CN Series Stretch-to-Load Hytorc Nut, Wayback Machine Capture dated May 10, 2015, 1 Page.

Re: Johannes Schneeberger, Letter from Sean Egan, Nov. 12, 2020, 2 Pages.

Assignment of Membership Interest Agreement, Nov. 1, 2018, 3 Pages.

Certificate of Organization and Operating Agreement for The Reaction Washer Company, May 12, 2016, 26 Pages.

First Amended Complaint in *Reaction Washer* v. *IDEPA*, U.S. District Court, District of Utah, Civil No. 2:19-cv-00148-DBP, submitted Apr. 15, 2019, 22 Pages.

Answer to First Amended Complaint in *Reaction Washer* v. *IDEPA*, U.S. District Court, District of Utah, Civil No. 2:19-cv-00148-DBP, submitted Sep. 19, 2019, 9 Pages.

Kirkpatrick, John C., Request for Information and Evidence Under 37 C.F.R. 11.22(f), Aug. 18, 2020, 7 Pages.

Office Action, U.S. Appl. No. 16/150,633, dated Apr. 23, 2020, 31 Pages.

Search Report, Singapore Patent Application No. 11201803772S, dated Aug. 19, 2019, 3 Pages.

(56) References Cited

OTHER PUBLICATIONS

Written Opinion, Singapore Patent Application No. 11201803772S, dated Aug. 20, 2019, 7 Pages.
Office Action, U.S. Appl. No. 16/213,269, dated Apr. 20, 2020, 33 Pages.
Supplementary European Search Report, European Patent Application No. EP 16863121, dated May 16, 2019, 10 Pages.
Kirkpatrick, John C., Termination of Investigation, Mar. 22, 2021, 1 Page.
Memorandum Decision and Order Granting [97] Defendants' Motion for Summary Judgment and Denying [99] Plaintiff'S Motion for Partial Summary Judgment in *Reaction Washer* v. *IDEPA*, U.S. District Court, District of Utah, Civil No. 2:19-cv-00148-DBP, submitted Sep. 19, 2019, 16 Pages.
U.S. Appl. No. 62/758,676, filed Nov. 11, 2018, listing only Johannes Schneeberger as a purported inventor (No copy of the application is provided because the requirement for such a copy is waived where it is present in USPTO's IFW System (See Waiver of the Copy Requirement in 37 CFR 1.98 for Cited Pending U.S. Patent Applications, 1287 OG 163 (Oct. 19, 2004).).
Goff, Jared, Discussion of Assignment of U.S. Appl. No. 14/932,768, Now U.S. Pat. No. 10,107,325 Covering Continuation-In-Part Applications, with assignments attached, Feb. 14, 2020, 12 Pages.
International Preliminary Report on Patentability, PCT/US16/60714, dated Jul. 17, 2017, 16 Pages.
International Search Report, International Application No. PCT/US18/34746, dated Aug. 28, 2018, 2 Pages.
International Search Report, PCT/US16/60714, dated Mar. 17, 2017, 5 Pages.
Office Action, U.S. Appl. No. 14/932,768, dated Dec. 5, 2017, 6 Pages.
Office Action, U.S. Appl. No. 15/605,861, dated May 31, 2019, 15 Pages.
Office Action, U.S. Appl. No. 15/605,876, dated Mar. 12, 2019, 16 Pages.
Written Opinion of the International Searching Authority, PCT/US18/34746, dated Aug. 28, 2018, 5 Pages.

\* cited by examiner

ENGAGING WASHERS

BACKGROUND

In typical bolt tightening operations using power tool, a user situates a drive socket attached to a power tool onto a tightening head (a bolt head or nut) to be tightened. The user then triggers the power tool, so that the tool rotates the drive socket, applying a torque to the tightening head, and rotating the tightening head to clamp a flange between the tightening head and an opposing head (a bolt head or nut), with the tightening head and the opposing head each pulling on a bolt shaft that passes through the flange.

During the tightening, a reaction force is created in the power tool, typically requiring the user to apply a manual force to the power tool, keeping the tool from spinning as it tightens the bolt head or nut. Additionally, the opposing head may tend to spin during the tightening operation due to the force from the tightening head via a bolt shaft. If the opposing head spins at the same rate as the tightening head, then no tightening will occur. Accordingly, users may hold the opposing head in place with a hand wrench at the same time the tightening head is being rotated to tighten the bolt. Accordingly, users may have to apply reaction forces to the tightening power tool that actuates the tightening head and apply opposing forces to a wrench that inhibits rotation of the opposing head.

Rather than requiring users to apply reaction forces to the tightening tool, some power tools include reaction arms attached to the power tool that can be positioned against stationary members near the bolt being tightened to handle the reaction forces and prevent the tightening power tool from rotating while applying torque to the tightening head. Alternatively, reaction washers have been used to handle the tightening reaction forces between the power tool and the tightening head. A reaction washer is designed to be positioned between the tightening head and the flange being clamped and to handle reaction forces. The reaction washer can have features to engage the clamped surface of the flange as the bolt is tightened and can have additional features that can engage with a device such as a reaction socket that is secured to the power tool. Thus, the reaction washer can be secured to the power tool via the reaction socket and can resist rotation via its features to engage the clamped surface. Accordingly, the reaction forces can be handled via the reaction washer, relieving the user from handling the reaction forces by manually applying torque to the power tool.

Additionally, backup washers have been used to oppose spinning of the opposing head during bolt tightening. A backup washer can be positioned between the opposing head and the flange. The engaging forces between the opposing head and the backup washer and between the backup washer and the flange can be greater than the engaging forces would be directly between the opposing head and the flange. Thus, backup washers have been used to increase engagement between the opposing head and the flange during tightening to inhibit rotation of the opposing head relative to the flange. Accordingly, reaction washers and backup washers are examples of engaging washers for bolt tightening applications.

SUMMARY

Whatever the advantages of previous engaging washers, they have neither recognized the engaging washer features described and claimed herein, nor the advantages produced by such engaging washer features. Some different engaging washer aspects and features will now be discussed. Such aspects and features may be used separately and/or in combination with each other.

In one aspect, an engaging washer, which may be a backup washer or a reaction washer, can include an inner row of teeth extending around a central axis of the engaging washer, with the inner row of teeth including a plurality of teeth that each extends in a flange direction from a body of the engaging washer, with the flange direction being parallel to the central axis. The engaging washer can also include an outer row of teeth extending around the inner row of teeth, with the outer row of teeth including a plurality of teeth that each extends in the flange direction from the body of the engaging washer, and with the outer row of teeth being farther from the central axis of the engaging washer than the inner row of teeth.

In another aspect, an engaging washer can include an inner ring extending around a central axis of the engaging washer, with the inner ring being configured to contact a clamped surface. The engaging washer can also include a bridge extending around the inner ring, with the bridge defining a cavity configured to open toward the clamped surface, and with the cavity extending around the inner ring. The engaging washer can also include an outer ring extending around the bridge, with the outer ring being configured to contact the clamped surface. Additionally, the engaging washer can include engaging elements (such as the teeth or wedges discussed above) extending axially from the engaging washer and being configured to contact the clamped surface. The engaging elements may be different shapes— for example teeth can act as engaging elements whether those teeth are shaped as wedges, spikes, or some other engaging shape.

In yet another aspect, an engaging washer can include an annular body forming a substantial arch extending in radial directions from an axis of the engaging washer. The annular body can include an annular head-facing surface facing substantially in a first axial direction, with the head-facing surface being substantially convex in radial directions extending from the axis of the engaging washer. The annular body can also include an annular flange-facing surface that faces substantially opposite to the head-facing surface, with the flange-facing surface being substantially concave in the radial directions extending from the axis of the engaging washer. Additionally, the engaging washer can include engaging elements extending away from the flange-facing surface.

In yet another aspect, a reaction washer system can include a reaction washer. The reaction washer can include an annular body extending around an axis. The reaction washer can also include a plurality of castles extending radially out from an outer periphery of the annular body. Each of the castles can include a base step secured to the body and extending radially out from the body, with the base step having a flange-facing surface facing substantially in an axial flange direction. Each castle can also include an extension step secured to the base step and extending radially out from the base step. The extension step can have a flange-facing surface that is stepped relative to the flange-facing surface of the base step, with the flange-facing surface of the extension step facing substantially in the axial flange direction, so that the flange-facing surface of the base step is located axially offset in the flange direction and radially inward from the flange-facing surface of the extension step.

In yet another aspect, a reaction washer system can include a reaction washer. The reaction washer can include an annular body extending around an axis of the reaction washer. The reaction washer can also include a plurality of castles extending radially out from an outer periphery of the annular body, with each of the castles including a circumferentially-facing surface. The reaction washer system can also include a reaction socket that can include a plurality of fingers each having a circumferentially-facing surface that contacts a corresponding one of the circumferentially-facing surfaces of one of the castles of the reaction washer at a contact area to form an abutting finger-castle pair, wherein the contact area can be substantially a line.

In yet another aspect, a technique can include making a first engaging washer. The first washer can include an inner row of teeth extending around a central axis of the first engaging washer, with the inner row of teeth including a plurality of teeth that each extends in a first axial flange direction away from a body of the first engaging washer. The first washer can also include an outer row of teeth extending around the inner row of teeth of the first engaging washer, with the outer row of teeth including a plurality of teeth that each extends in the first axial flange direction away from the body of the first engaging washer. The first washer can also include a bridge extending between the inner row of teeth and the outer row of teeth of the first engaging washer, with the bridge of the first engaging washer defining a cavity between the inner row of teeth and the outer row of teeth of the first engaging washer. The technique can also include making a second engaging washer. The second engaging washer can include an inner row of teeth extending around a central axis of the second engaging washer, with the inner row of teeth including a plurality of teeth that each extends in a second axial flange direction away from a body of the second engaging washer. The second engaging washer can also include an outer row of teeth extending around the inner row of teeth of the second engaging washer, with the outer row of teeth including a plurality of teeth that each extends in the second axial flange direction away from a body of the second engaging washer. The second washer can also include a bridge extending between the inner row of teeth and the outer row of teeth, with the bridge defining a cavity between the inner row of teeth and the outer row of teeth, with the cavity of the second engaging washer being deeper than the cavity of the first engaging washer. Shape and dimensions of the first engaging washer and the second engaging washer can be substantially the same except for differences in one or more of shape and dimensions between the cavity of the first engaging washer and the cavity of the second engaging washer.

In yet another aspect, a technique can include designing an engaging washer. The engaging washer can include an inner row of teeth extending around a central axis of the engaging washer, with the inner row of teeth including a plurality of teeth that each extends in an axial flange direction away from a body of the engaging washer. The engaging washer can also include an outer row of teeth extending around the inner row of teeth, with the outer row of teeth including a plurality of teeth that each extends in the flange direction away from the body of the engaging washer. Additionally, the engaging washer can include a bridge extending between the inner row of teeth and the outer row of teeth, with the bridge defining a cavity between the inner row of teeth and the outer row of teeth. The designing of the engaging washer can include adjusting a resistance of the engaging washer to being compressed by adjusting a depth of the cavity to a final depth. The technique can further include making the engaging washer with the cavity having the final depth.

In yet another aspect, a backup washer can include an annular body extending around a central axis of the backup washer. The backup washer can also include a plurality of teeth circumferentially spaced around a flange-facing surface of the annular body, with each of the plurality of teeth extending from the annular body in a flange direction. Additionally, the reaction washer can include a head-facing surface opposite to the flange-facing surface, with the head-facing surface having engaging texturing features formed therein.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

BRIEF DESCRIPTION OF THE DRAWINGS

The description and drawings may refer to the same or similar features in different drawings with the same reference numbers.

DETAILED DESCRIPTION

I. Engaging Washer Bolt System

Figure 1:
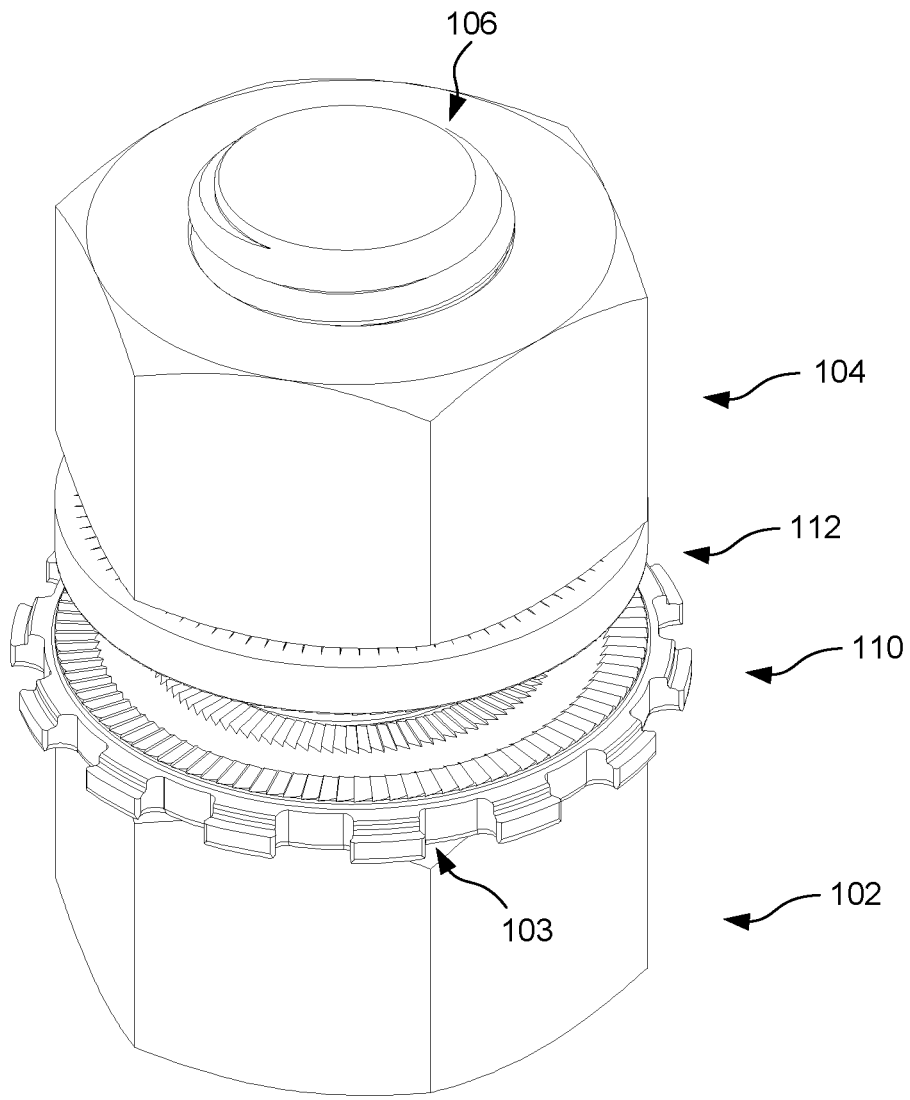
FIG. 1 is a perspective view of an engaging washer bolt system from a backup washer side of the system.
Figure 2:
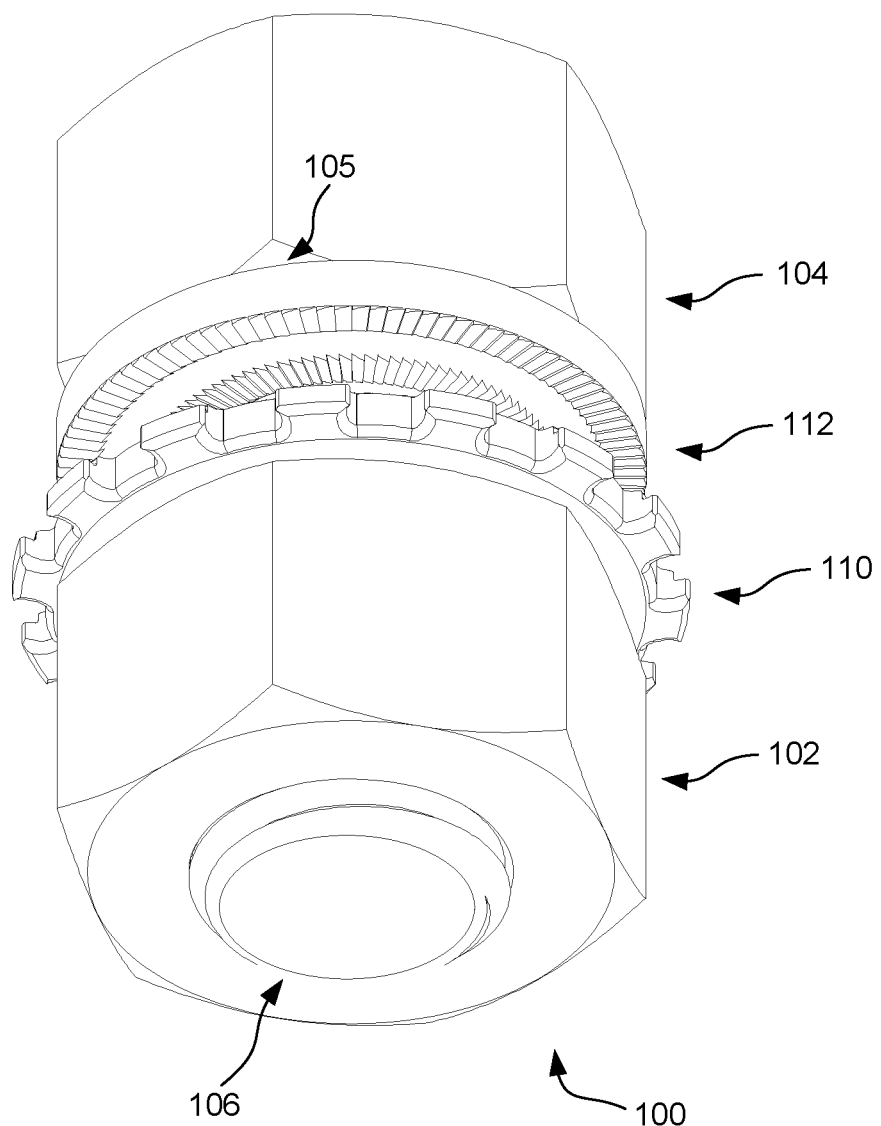
FIG. 2 is a perspective view of the engaging washer bolt system of FIG. 1 from a reaction washer side of the system.
Figure 3:
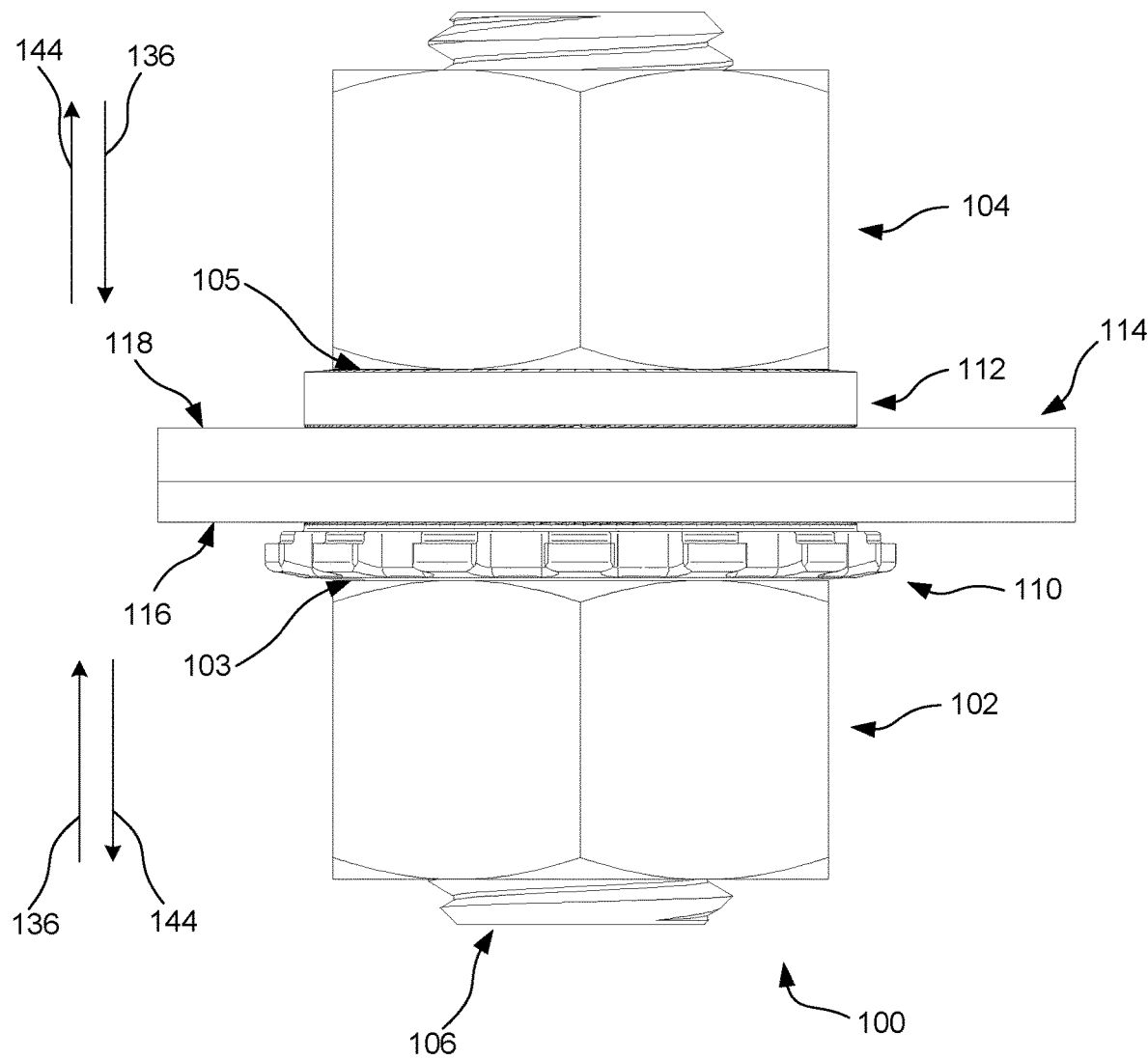
FIG. 3 is a radial side view of the engaging washer bolt system of FIG. 1, with a flange clamped between the reaction washer and the backup washer of the system.
Figure 4:
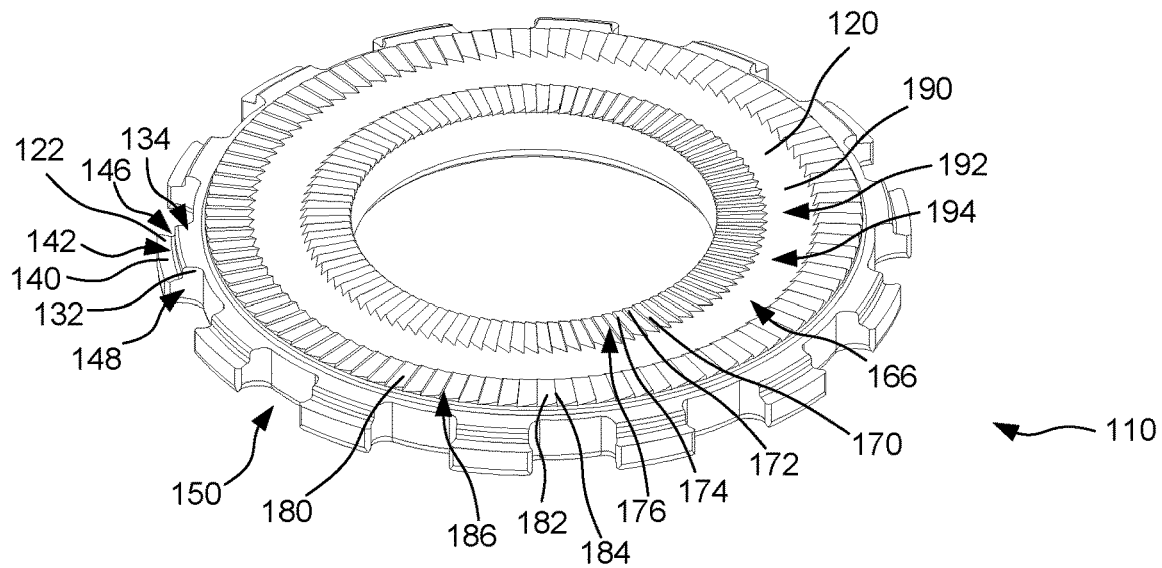
FIG. 4 is a perspective view of the reaction washer from the bolt system of FIG. 1, from a flange side of the reaction washer.
Figure 5:
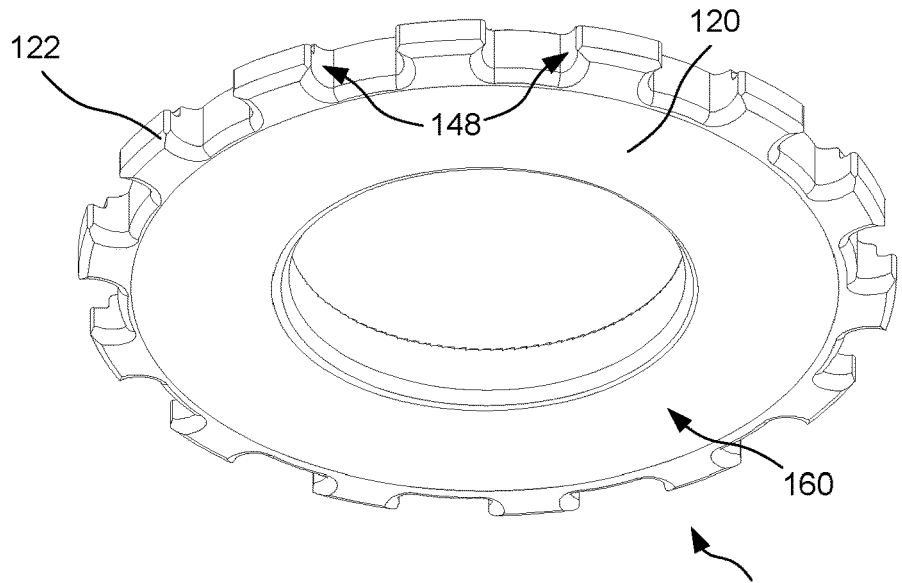
FIG. 5 is a perspective view of the reaction washer of FIG. 4, from a head side of the reaction washer.
Figure 6:
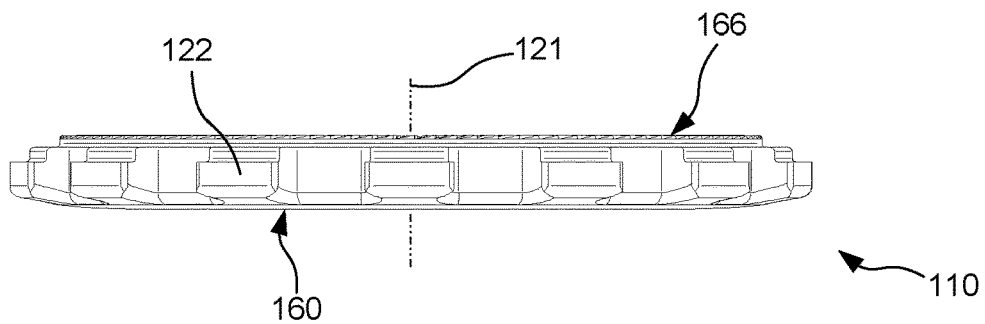
FIG. 6 is a radial side view of the reaction washer of FIG. 4.
Figure 7:
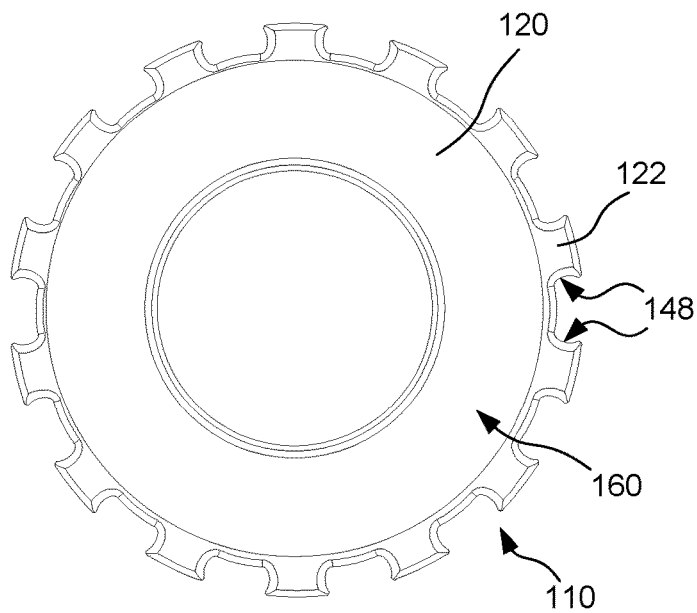
FIG. 7 is a head side view of the reaction washer of FIG. 4.
Figure 8:
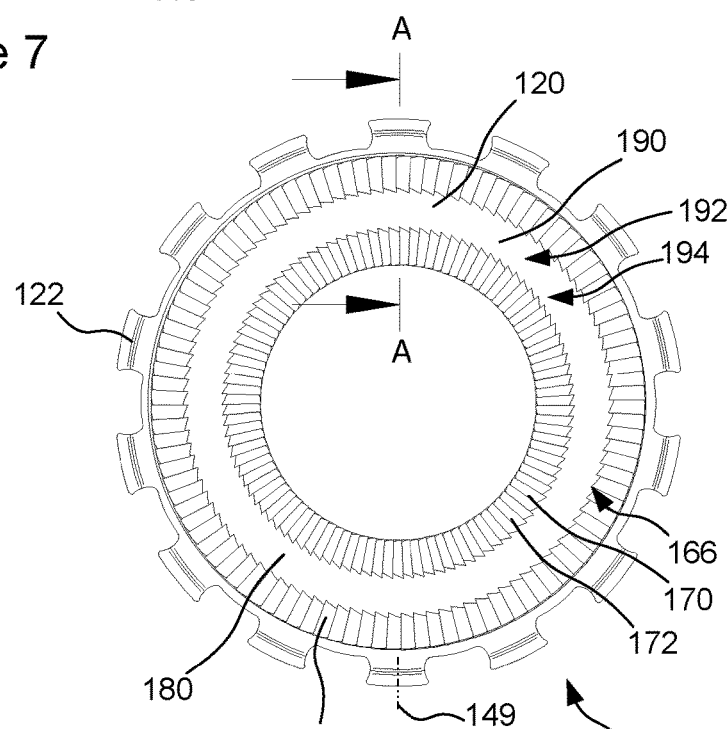
FIG. 8 is a flange side view of the reaction washer of FIG. 4.
Figure 9:
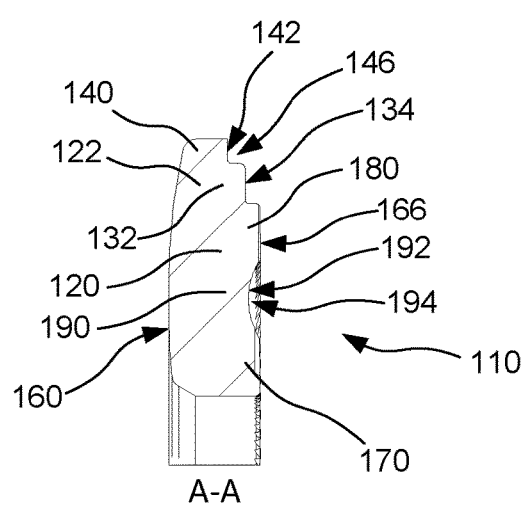
FIG. 9 is a cut away sectional view taken along line A-A of FIG. 8.
Figure 10:
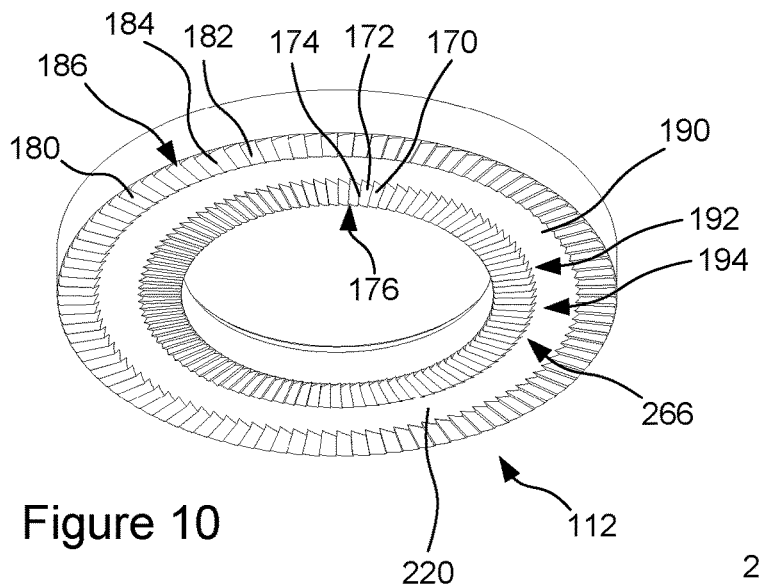
FIG. 10 is a perspective view of the backup washer from the bolt system of FIG. 1, from a flange side of the backup washer.
Figure 11:
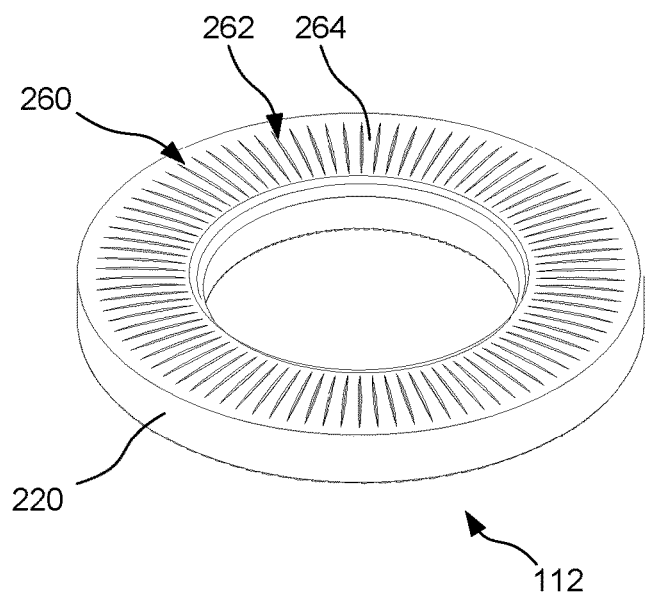
FIG. 11 is a perspective view of the backup washer of FIG. 10, from a head side of the backup washer.
Figure 12:
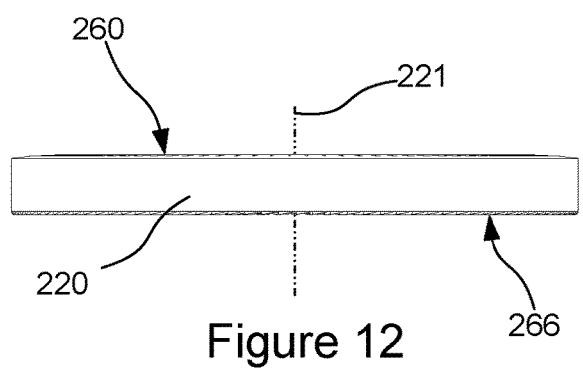
FIG. 12 is a radial side view of the backup washer of FIG. 10.
Figure 13:
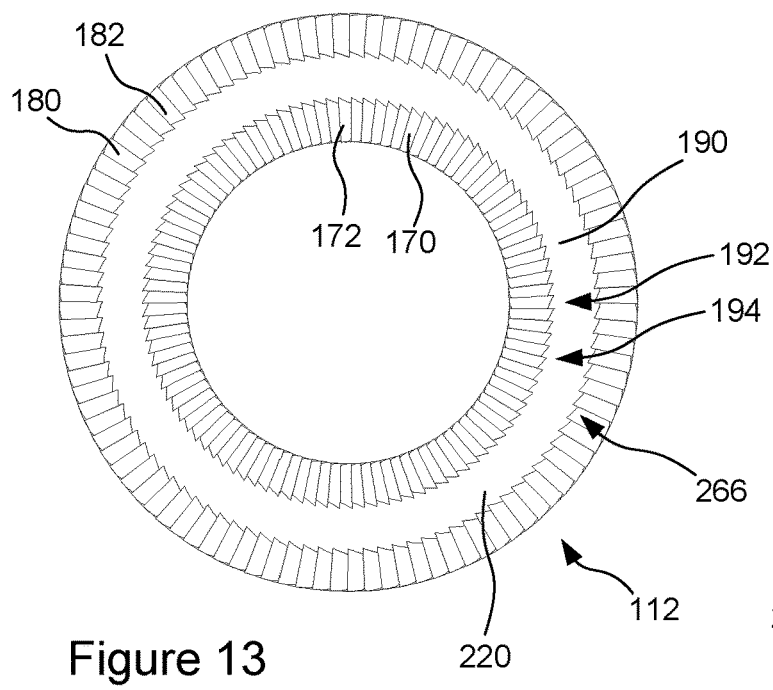
FIG. 13 is a flange side view of the reaction washer of FIG. 10.
Figure 14:
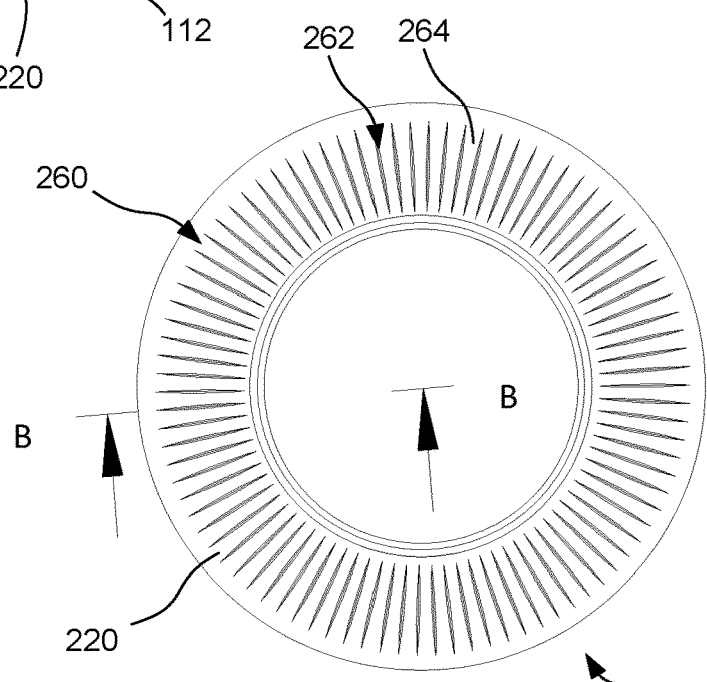
FIG. 14 is a head side view of the reaction washer of FIG. 10.
Figure 15:
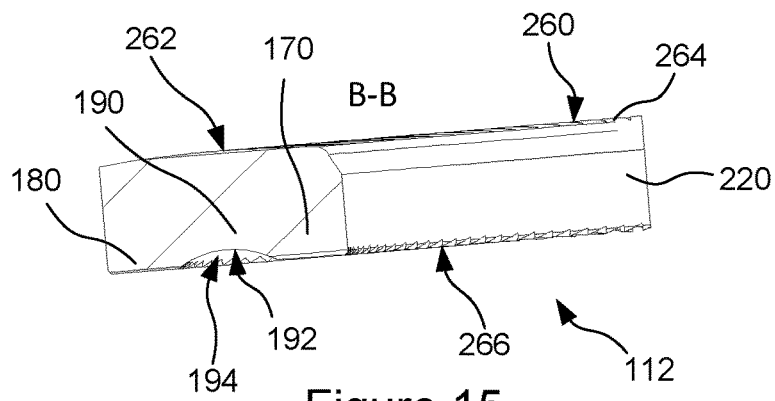
FIG. 15 is a cut away sectional view taken along line B-B of FIG. 14.

Referring to FIGS. 1-3, an engaging washer bolt system 100 is illustrated. The system 100 can include a tightening head 102 defining a clamping surface 103 and an opposing head 104 defining a clamping surface 105, with both heads 102 and 104 engaging a bolt shaft 106. For example, each of the heads 102 and 104 may be a bolt head or a nut. The bolt shaft 106 can include external threads, and one or both heads 102 and/or 104 can include internal threads that can mate with the external threads of the bolt shaft 106. The heads 102 and 104 can be turned in opposite directions relative to each other to move one or both heads 102 and/or 104 along the threads of the bolt shaft 106 and move the heads 102 and 104 closer to or farther from each other. As discussed herein, the tightening head 102 is the head that is designed to be rotated to tighten or loosen the clamping force of the bolt system 100. The opposing head 102 is a head that is designed to retain its rotational position so the tightening head 102 can rotate relative to the opposing head 102.

The bolt system 100 can also include engaging washers, which can include a reaction washer 110 and a backup washer 112. One of the engaging washers can be positioned between each of the heads 102 and 104 and a flange 114 being clamped between the heads 102 and 104, with one clamped surface 116 of the flange 114 facing toward the tightening head 102 and an opposite clamped surface 118 of the flange 114 facing toward the opposing head 104. As used herein, a flange is broadly defined as an item that is being clamped by the bolt system 100, and may include one or more of many types of items. Accordingly, the engaging washers 110 and 112 are clamped between the heads 102 and 104, and the flange is clamped between the engaging washers 110 and 112. In use, the reaction washer 110 can operate to resist and handle reaction forces generated when tightening or loosening the heads 102 and 104 by engaging the flange 114 and a reaction socket (discussed in detail below) that is secured to a tool that is engaging the tightening head 102 during tightening. The backup washer 112 can operate to resist rotation of the opposing head 104 by engaging the head 104 and the flange 114. The different engaging washers 110 and 112 can be used with or without each other. For example, one bolting system may include a reaction washer 110, but not a backup washer 112, and another system may include a backup washer 112 and not a reaction washer 110.

A. Reaction Washer

Referring now to FIGS. 4-9, the reaction washer 110 will be discussed in more detail. The reaction washer 110 can include a substantially annular body 120 that extends around an axis 121 of the reaction washer 110. As used herein, substantially means in effect, mainly, or the same in material respects, allowing some deviation from precise terms modified by the term substantially, such as shapes or directions, while retaining the overall features of those terms. For example, substantially in a direction means in that same general direction. For example, substantially in an axial direction means closer to the axial direction than another type of direction such as a radial or circumferential direction. Similarly, substantially curved encompasses a part that includes a series of small planar surfaces that overall form a curve of a type specified in material respects. Also, a feature is considered to extend in a direction if some component of the feature extends in that direction. For example, the castles discussed below can be considered to extend radially even if some portions of the castles also extend in circumferential directions (such as on their curved engaging surfaces). Similarly, engaging teeth can be considered to extend axially or in a flange direction even if the engaging teeth slope in a circumferential direction as they extend axially.

Castles 122 can extend radially out from the reaction washer body 120. As used herein, castles refer to circumferentially spaced protrusions extending from the reaction washer body 120 that are configured to engage with reaction socket fingers (discussed more below) to inhibit rotation of the reaction socket. The castles may be shaped and oriented in different ways and still considered castles, as used herein.

Each castle 122 can include a base step 132 that extends radially out from a periphery of the reaction washer body 120. The base step 132 can include a flange-facing surface 134 that faces in a flange direction 136. Each castle 122 can also include an extension step 140, which can include a flange-facing surface 142 that is offset from the flange-facing surface 134 of the base step 132 in a head direction 144 that is opposite from the flange direction 136.

As used herein, the flange direction 136 or axial flange direction is toward the flange being clamped during normal use in a direction substantially parallel to the axis of the reaction washer 110 or the axis of the backup washer 112. Similarly, the head direction 144 or axial head direction is toward an adjacent head during normal use in a direction substantially parallel to the axis of the reaction washer 110 or the axis of the backup washer 112. Accordingly, the flange direction 136 and head direction 144 will be substantially opposite directions on opposite sides of a flange being clamped during normal use. Accordingly, the flange-facing surfaces are facing in the flange direction and head-facing surfaces are facing the head direction. Nevertheless, such directional terms and other such directional terms are used herein for simplicity and convenience in the description of the features and should not be considered limiting except in reference to other features and directional terms that are also recited.

Referring still to FIGS. 4-6 and 7-9, each castle 122 can define a locking space 146 located radially out from the base step 132 and in the flange direction 136 from the extension step 140.

Each castle can also define substantially circumferentially-facing engaging surfaces 148 on opposite sides of a radial midline 149 of the castle. Each engaging surface 148 can begin at a base of the castle 122 and extend radially outward, first sloping deeper into the castle 122 toward the midline 149 and then sloping shallower and away from the midline 149, so that each castle is wide at is base, and then narrows, and then widens again. As an example, each castle engaging surface 148 may be substantially concavely curved along substantially radial paths extending out from the reaction washer body 120. For example, each engaging surface 148 may form a concave elliptical curve.

The reaction washer 110 can also define circumferentially-spaced and axially-extending finger spaces 150 between adjacent castles 122, with the engaging surfaces 148 facing toward the finger spaces 150.

Additionally, the reaction washer 110 can define a substantially annular head-facing surface 160. The head-facing surface 160 can extend along the reaction washer body 120 and can also extend out to form head-facing surfaces of the castles 122. As the head-facing surface 160 extends radially out from an inner periphery of the reaction washer body 120, the head-facing surface 160 can slope in the head direction 144 until it reaches a summit and can then extend in a flange direction 136 as it continues extending outward toward and along the castles 122. In an example, the head-facing surface 160 may have a continuous convex curvature as it extends in radial directions.

The reaction washer 110 can also include a flange-facing surface 166 of the reaction washer body 120, with the flange-facing surface 166 facing in the flange direction 136. The flange-facing surface 166 can include an inner ring 170, which can define an inner row of teeth 172 spaced circumferentially around the axis 121 of the reaction washer. The teeth 172 on the inner ring 170 can extend in the flange direction 136 from the reaction washer body 120. The teeth 172 in the inner row can also slope in a first circumferential direction as they extend from the reaction washer body 120. As an example, each tooth can form a wedge with a distal edge 174 (distal from the reaction washer body 120) that extends in a substantially radial direction. Additionally, each edge 174 can slope in the head direction 144 as it extends radially out from the inner periphery of the tooth 172. Radially-extending channels 176 can be defined between adjacent teeth 172, and each channel 176 can also slope in the head direction 144 as it extends radially out from the inner periphery of the channel 176.

The flange-facing surface 166 can also include an outer ring 180, which can define an outer row of teeth 182 spaced circumferentially around the inner ring 170. The teeth 182 on the outer ring 180 can extend in the flange direction 136 from the reaction washer body 120. The teeth 182 in the outer row can also slope in a second circumferential direction as they extend from the reaction washer body 120, with the second circumferential direction being opposite to the first circumferential direction. As an example, each tooth 182 can form a wedge with a distal edge 184 (distal from the reaction washer body 120) that extends in a radial direction. Additionally, each edge 184 can slope in the head direction 144 as it extends radially in from the outer periphery of the tooth 182. Radially-extending channels 186 can be defined between adjacent teeth 182, and each channel 186 can also slope in the head direction 144 as it extends radially in from the outer periphery of the channel 186.

Thus, in use, the inner row of teeth 172 can engage the flange 114 and have a greater tendency to inhibit rotation of the reaction washer 110 relative to the flange 114 in a first direction. For example, this may be the direction the reaction washer 110 tends to rotate during loosening of the tightening head 102 (i.e., the direction of rotation of the tightening head 102 during loosening as the tightening head 102 slides along the head-facing surface of the reaction washer 110). The outer row of teeth 182 can engage the flange 114 and have a greater tendency to inhibit rotation of the reaction washer 110 relative to the flange in a second direction that is opposite the first direction. For example, this may be the direction the reaction washer 110 tends to rotate during tightening of the tightening head 102 (i.e., the direction of rotation of the tightening head 102 during tightening as the tightening head 102 slides along the head-facing surface 160 of the reaction washer 110).

The reaction washer body 120 can include an annular bridge 190 extending between the inner ring 170 and the outer ring 180. A flange-facing surface 192 of the bridge 190 can define a cavity 194 that opens in the flange direction 136. For example, the flange-facing surface 192 may be concavely curved as it extends in radial directions. The cavity 194 can be joined with the channels 176 and channels 186 between the teeth 172 and 182, respectively, to allow material to flow from the channels 176 and channels 186 into the cavity 194.

Accordingly, radial cross-sections of the reaction washer 110 can be substantially arched, with the flange-facing surface 192 and the head-facing surface 160 both sloping in the head direction 144 as they extend in from the outer periphery of the cavity 194 and out from the inner periphery of the cavity 194. With the reaction washer 110 in the bolt system 100, this arched configuration can result in initially having a ring-shaped line contact area between the tightening head 102 and the head-facing surface 160, with that contact area being located between in inner and outer peripheries of the reaction washer body 120. Initially, the inner end of the edges 174 of the inner teeth 172 and the outer end of the edges 184 of the outer teeth 182 can contact the flange 114. As the clamping force gradually increased, the arched shape of the reaction washer body 120 can gradually collapse, resulting in the contact area between the tightening head 102 and the head-facing surface 160 of the reaction washer 110 gradually widening and increasing. Likewise, the contact area between the teeth and the flange 114 can gradually increase as the clamping force increases. Specifically, the outer portions of the edges 174 of the inner teeth 172 can initially be raised away from the flange 114, and the inner portions of the edges 184 of the outer teeth 182 can initially be raised away from the flange 114. As the clamping force increases, the teeth 172 and 182 can penetrate the flange 114. Also, as the clamping force increases and the reaction washer 110 gradually collapses, the teeth 172 and 182 can gradually flatten to increase the portions of the teeth 172 and 182 that are in contact with the flange 114. This gradual flattening can also force material, such as paint or grease, that is trapped between the inner ring 170 and the flange 114 to flow radially out along the channels 176 toward the cavity 194. Similarly, the gradual flattening can force material that is trapped between the outer ring 180 and the flange 114 to flow radially in along the channels 186 toward the cavity 194. This flowing of trapped material toward the cavity 194 can help to keep such material from interfering with the engagement between the flange 114 and the teeth 172 and 182.

B. Backup Washer

Referring now to FIGS. 10-15, the backup washer 112 will be discussed in more detail. In general, the backup washer 112 can have a similar structure to the reaction washer 110 discussed above. However, the castles 122 can be omitted from the backup washer 112 (although they could be included in at least some situations without interfering with the operation of the backup washer). The backup washer 112 can include an annular body 220 that extends around a central axis 221.

The backup washer 112 can include a head-facing surface 260, which can be like the head-facing surface 160 of the reaction washer 110. However, the head-facing surface 260 of the backup washer 112 can define features to increase engagement between the backup washer 112 and the opposing head 104, such as radially-extending slots 262 therein. The head-facing surface 260 can form plateaus 264 between the radially-extending slots 262. These features, including the slots 262 and the plateaus 264, can increase grip or engagement between the backup washer 112 and the opposing head 104. This can inhibit rotation of the opposing head 104 relative to the backup washer 112 during tightening of the tightening head 102. The structure of these features may be altered in different designs. For example, the slots 262 may be widened to provide greater grip between the backup washer 112 and the opposing head 104.

The backup washer body 220 can define a flange-facing surface 266 opposite the head-facing surface 260. The flange-facing surface 266 can include the same features as those on the reaction washer 110 discussed above, although some different features may be used in some embodiments of different reaction washers and/or backup washers. Nevertheless, for the sake of simplicity, the same reference numbers used for the features of the flange-facing surface 166 of the reaction washer 110 will also be used on the features of the flange-facing surface 266 of the backup washer 112. Additionally, the arched structure of the backup washer 112 can operate in the same manner as the arched structure of the reaction washer 110, with similar gradual collapse of the arch and increase of contact surface areas as the clamping force increases.

C. Adjusting the Cavity and Bridge to Adjust Washer Stiffness

Figure 16:
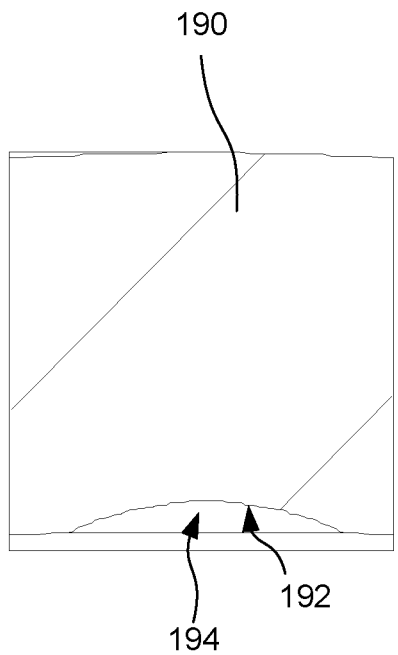
FIG. 16 is a cut away section view of a first bridge and cavity from an engaging washer.
Figure 17:
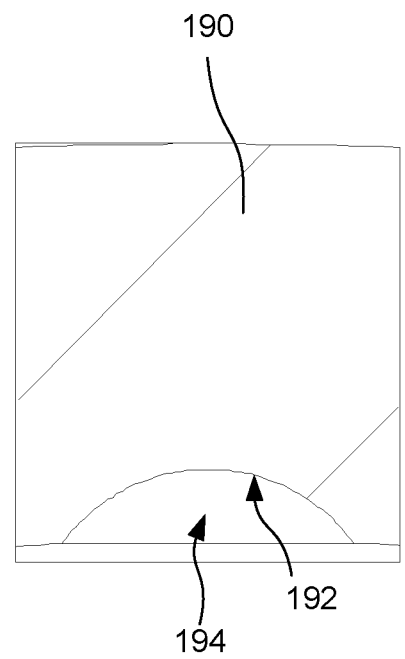
FIG. 17 is a cut away sectional view of a second bridge and cavity from an engaging washer.

As discussed above, the reaction washer 110 and the backup washer 112 each include a bridge 190 that defines a flange-facing cavity 194 as part of the flange-facing surfaces. FIGS. 16-17 illustrate different designs of the bridge 190 and the cavity 194. In FIG. 16, the cavity 194 is shallower and the bridge 190 is thicker than in FIG. 17. It has been found that this will result in a washer with the bridge 190 and cavity 194 of FIG. 16 being stiffer and more resistant to collapse than a washer with the thinner bridge 190 and deeper cavity 194 of FIG. 17. It has been found that these features can be changed with different washers, while leaving their other dimensions the same, to adjust the stiffness and collapsing properties of the washers. As an example, it may be determined that one washer needs more stiffness, such as where the washer is made of less rigid material (such as a material with a lower modulus of elasticity) than another washer. In this case, a shallower cavity 194 can be used for the washer made with the less rigid material, so that the washer does not collapse too soon. For example, if a washer collapses too soon, then the teeth of the washer may not sufficiently penetrate the flange to resist rotation of the washer. As another example, it may be desirable to have the cavity 194 be shallower if the surface hardness of the flange is greater, because a shallower cavity can make the reaction washer more resistant to collapsing, thereby preventing the contact surface area of the teeth from increasing too rapidly as the clamping force increases. In other words, greater resistance to flattening for the washer can increase the force concentration at the tips of the teeth that initially contact the flange, to increase penetration of those tips into the hard flange material. As another example, if high strength bolts are used and a high clamping force is called for by specifications, it may be desirable for the washer to resist flattening out until the clamping force is very high. Having the cavity 194 be shallower can help achieve this result. In each of these examples, different washers may be designed and manufactured with the same overall dimensions (within tolerances) except for the dimensions of the cavity 194 (and resulting dimensions of the bridge 190). For example, this may be achieved using the same dies for those different washers, except switching to different portions that achieve the recess depth (such as a different stamp ring where the cavity 194 is formed by a stamping operation).

D. Reaction Socket and Lock Ring System

Figure 18:
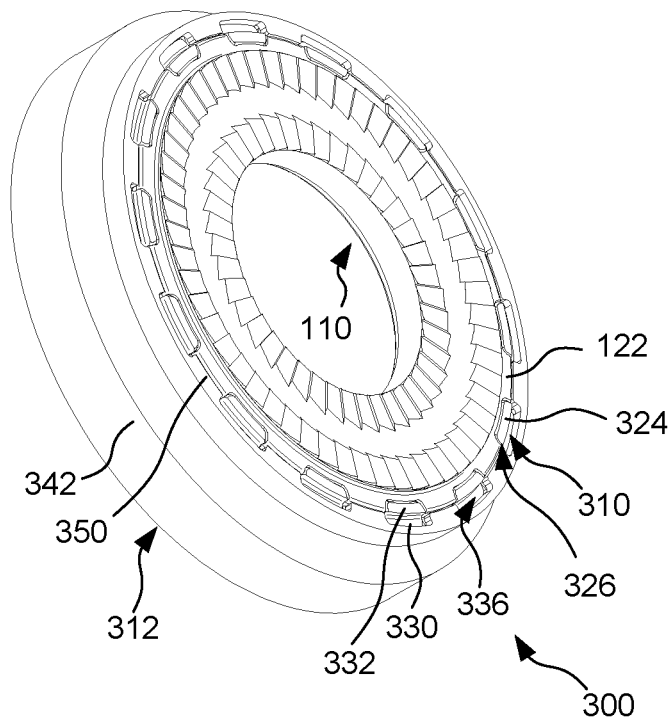
FIG. 18 is a perspective view of a reaction washer and socket system, from a flange-side of the reaction washer in the system.
Figure 19:
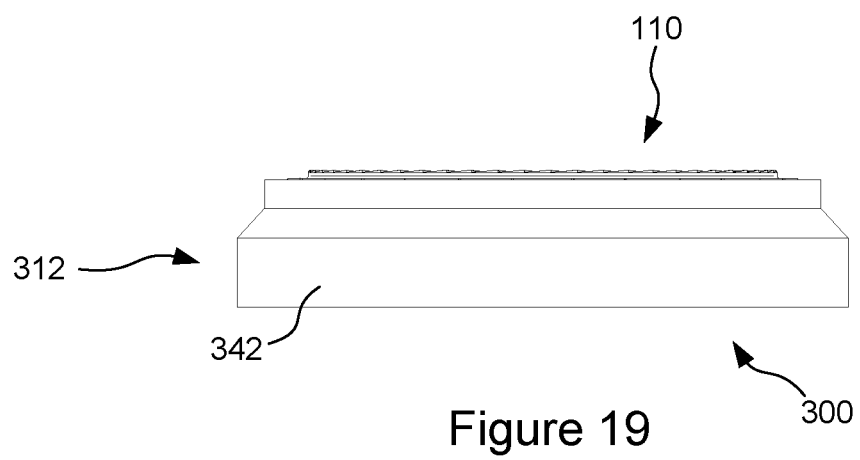
FIG. 19 is a radial side view of the reaction washer and socket system of FIG. 18.
Figure 20:
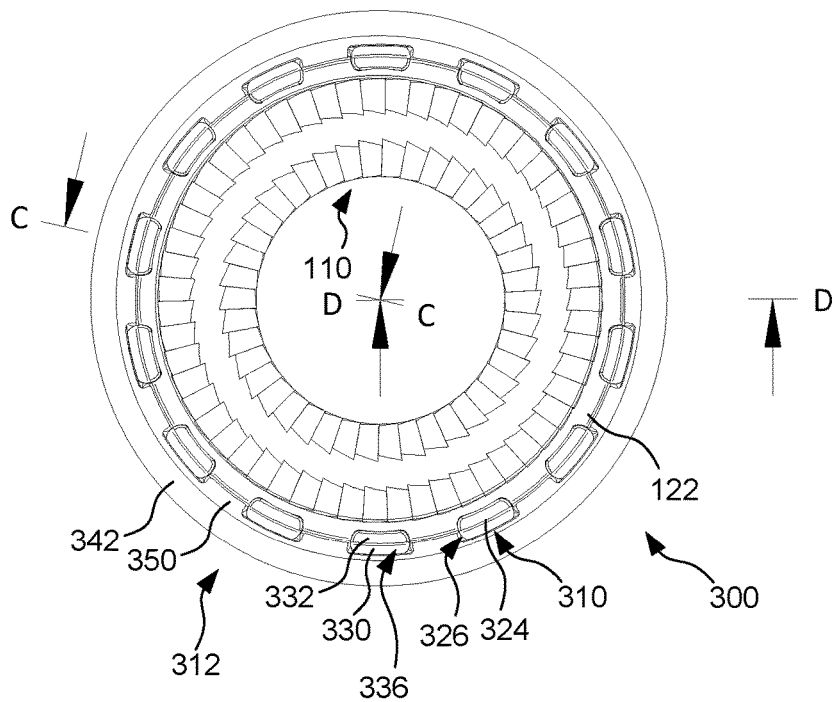
FIG. 20 is a flange side view of the reaction washer and socket system of FIG. 18.
Figure 21:
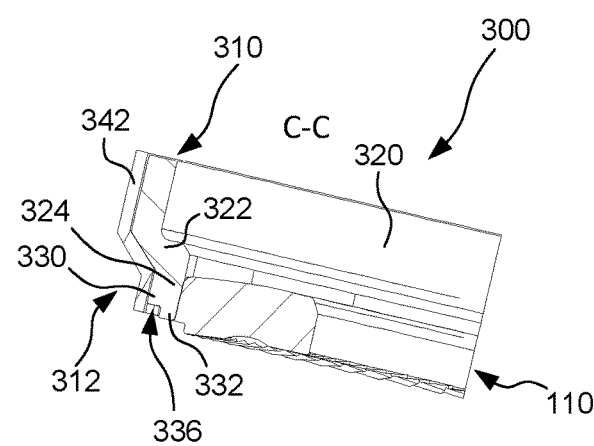
FIG. 21 is a cut away sectional view taken along line C-C of FIG. 20.
Figure 22:
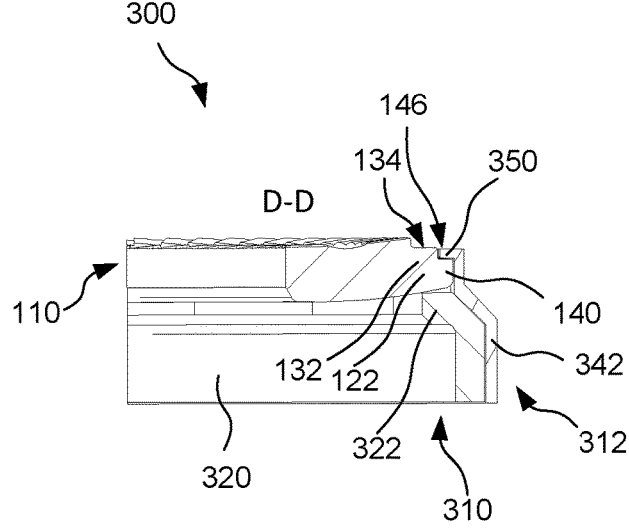
FIG. 22 is a cut away sectional view taken along line D-D of FIG. 20.

Referring now to FIGS. 18-22, a reaction socket and lock ring system 300 will be discussed. As is illustrated in FIG. 18, the reaction socket and lock ring system 300 can be part of the bolt system 100 and can interface with a reaction washer 110, such as the reaction washer 110 discussed above. This can be done with the reaction washer 110 operating in the bolt system 100 discussed above. Also, the reaction socket and lock ring system 300 can be used with a power tool driving a drive socket to rotate the tightening head 102. Also, the reaction socket can be attached to the housing of the power tool. For simplicity, these other components are not shown, and the reaction socket can extend farther away from the reaction washer toward the housing of the power tool than what is illustrated in the figures. With these other features in mind, the reaction socket and lock ring system 300 will be discussed.

1. Reaction Socket

Figure 23:
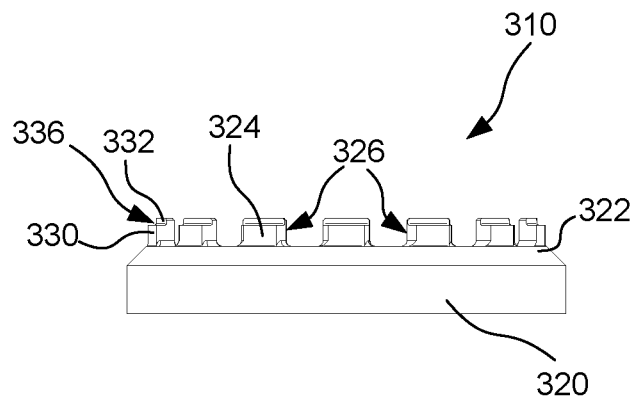
FIG. 23 is a radial side view of a reaction socket from the reaction washer and socket system of FIG. 18.
Figure 24:
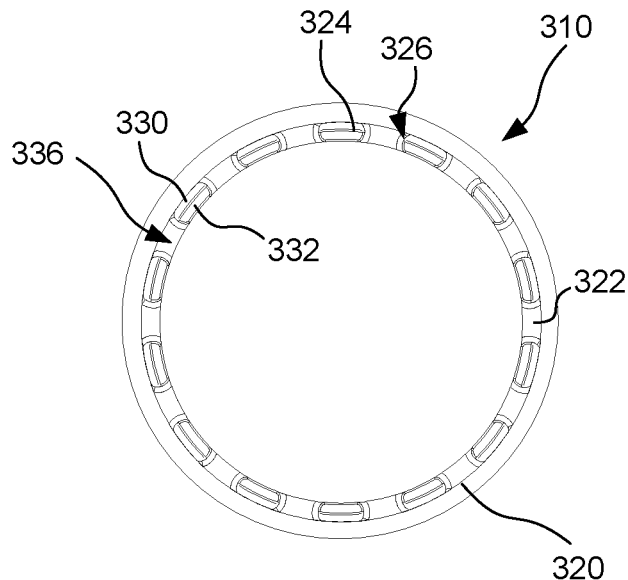
FIG. 24 is a flange-side view of the reaction socket of FIG. 23.
Figure 25:
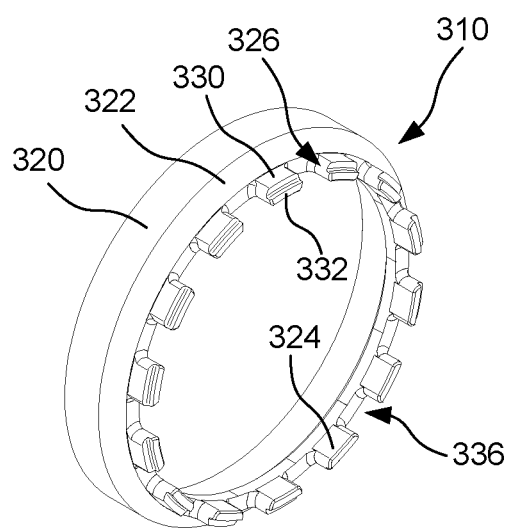
FIG. 25 is a perspective view of the reaction socket of FIG. 23, from a flange side of the reaction socket.

The reaction socket and lock ring system can include a reaction socket 310 and a lock ring 312. The reaction socket 310, which is illustrated by itself in FIGS. 23-25, can include a hollowed cylindrical body 320. At an axial end of the body 320, the body 320 can extend radially inwardly to form an inwardly-extending ring 322 at the axial end of the body 320. Circumferentially-spaced reaction fingers 324 can extend axially from the ring 322. The reaction fingers 324 can be shaped and spaced to fit into the finger spaces 150 between adjacent castles 122 of the reaction washer 110 (see also, e.g., FIG. 4). The reaction fingers 324 can define circumferentially-facing engaging surfaces 326 that can be convexly curved as they extend in radial directions to generally match the curvature of the circumferentially-facing engaging surfaces 148 of the reaction washer 110 (see also, e.g., FIG. 4). However, the engaging surfaces 326 of the reaction fingers 324 can have greater curvatures (smaller radii of curvature) than the corresponding engaging surfaces 148 of the castles 122 on the reaction washer 110. As a result, when the engaging surfaces 326 of the reaction fingers 324 contact the engaging surfaces 148 of the castles 122, the contact areas initially can be substantially axially-extending lines (though they may have some width in actual parts, and that width may increase with increasing force between the surfaces due to deformation). Such small contact areas can be beneficial allowing for some small deformation in the materials and/or in decreasing frictional forces when removing the reaction fingers 324 from the finger spaces 150 to remove the reaction socket 310 from the reaction washer 110 after a bolt tightening operation. Additionally, with the curvatures of the engaging surfaces 148 of the castles 122 widening the castles 122 near their distal ends, the distal ends of the castles 122 (the ends distal from the reaction washer body 120) can extend around the reaction fingers 324 to inhibit the tendency of the reaction fingers 324 to deform the castles 122 and slide radially outwardly along the castles 122 under torque loads between the reaction socket 310 and the reaction washer 110. For example, this could happen if the castle engaging surfaces 148 were to extend in radial directions, which may then deflect under torque loads to slant away from the reaction fingers 324 as the engaging surfaces 148 extend toward the distal ends of the castles 122.

The reaction fingers 324 can be stepped, including a base step 330 that extends axially from the reaction socket body 320, and an extension step 332 that extends axially beyond the base step 330. The extension step 332 can continue a radially inner portion of the base step 330 but can omit a radially outer portion of the base step 330. Thus, the reaction fingers 324 can each define a locking space 336 located axially beyond the base step 330 and radially out from the extension step 332.

2. Lock Ring

Figure 26:
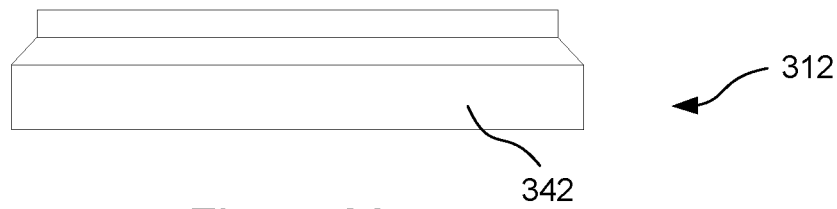
FIG. 26 is a radial side view of a lock ring from the reaction washer and socket system of FIG. 18.
Figure 27:
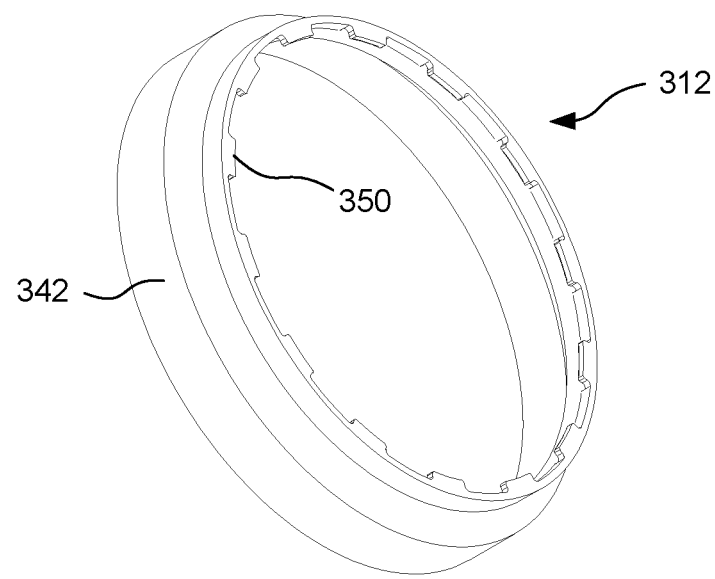
FIG. 27 is a flange-side view of the lock ring of FIG. 26.
Figure 28:
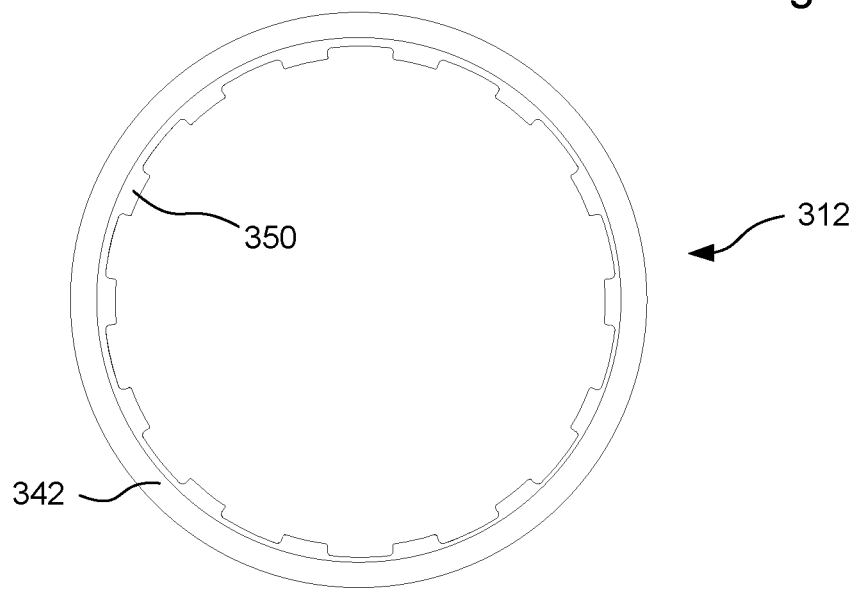
FIG. 28 is a perspective view of the lock ring of FIG. 26, from a flange side of the lock ring.

Referring still to FIGS. 18-22 and referring to FIGS. 26-28, the lock ring 312 will be discussed. The lock ring 312 can include a hollow cylindrical body 342 that can fit around the reaction socket 310. The lock ring 312 can be secured to the reaction socket 310 so that the lock ring 312 is able to rotate relative to the reaction socket 310 but is inhibited from substantial axial movement relative to the reaction socket 310. This can be done in different ways, such as with a spring retaining ring or some other feature that inhibits axial movement.

At an axial end of the body 342 of the lock ring 312 near the reaction fingers 324 of the reaction socket 310 (toward the flange 114 in use), the lock ring 312 can include locking fingers 350, which can extend radially inward to extend into the locking spaces 146 formed in the castles 122 on the reaction washer 110 and/or the locking spaces 336 formed in the reaction fingers 324 of the reaction socket 310.

For example, the lock ring 312 can be rotated so that the locking fingers 350 are aligned with the reaction fingers 324 of the reaction socket, with the locking fingers extending into the locking spaces 336. With the lock ring 312 in this position, the reaction socket 310 can be moved into position relative to the reaction washer 110, with the reaction fingers 324 extending into the finger spaces 150 between adjacent castles 122. The lock ring 312 can then be rotated to rotate the locking fingers 350 into locking spaces 146 formed in the castles 122 on the reaction washer 110. This is the position illustrated in FIGS. 18-22. In this position, the locking fingers 350 can engage the extension steps 140 of the castles 122 to inhibit axial movement of the lock ring 312, the reaction socket 310, and the attached power tool (not shown) away from the reaction washer 110. Accordingly, the power tool can be held securely relative to the reaction washer 110, and thereby be held securely relative to the tightening head 102. Indeed, with this locking position, a power wrench may even be used to tighten a bolt from below without a user needing to hold the weight of the power tool during the tightening operation. To remove the power wrench, the lock ring 312 can be rotated so that the locking fingers 350 align with the reaction fingers 324 and no longer engage the castles 122.

E. Materials and Manufacturing

The components discussed above can be made of any of various types of materials that exhibit desired properties, such as desired levels of strength, durability, rigidity, and hardness. For example, metals such as high strength steels may be used. Also, different dimensions and shapes of features may be used, with those discussed and shown in the figures being examples.

Manufacturing techniques in forming the parts discussed above can include techniques such as die casting, machining, and stamping. The structures of the parts of the engaging washer bolt system discussed above can be varied in different systems. Also, some parts of the system may be omitted in some embodiments. For example, in some systems a backup washer may not be used. In other systems, a reaction washer may not be used. Similarly, in some systems a reaction washer may be used, but the reaction socket may not include a separately moveable lock ring. For example, a reaction finger and a locking finger may be incorporated into a single finger on the reaction socket, such as an L-shaped or T-shaped finger that moves axially into a finger space and is then rotated so that a locking portion of the finger extends into a locking space between a portion of the adjacent castle and the flange. Also, features of the reaction washer and backup washer may be used without other features. For example, the stepped castles feature and the inner and outer teeth rows feature may each be used in reaction washers without the other feature.

II. Engaging Washer Use

Engaging washer use will now be described without including reference numbers corresponding to the reference numbers in the figures. In use, to tighten a bolt, a bolt shaft can be positioned through a flange. A backup washer can be positioned on the bolt shaft on one side of the flange, with its flange-facing surface facing toward the flange. A reaction washer can be positioned on the bolt shaft on the opposite side of the flange, with the reaction washer's flange-facing surface facing toward the flange. An opposing head can be positioned to engage the bolt shaft so that the backup washer is between the opposing head and the flange. Similarly, a tightening head can be positioned to engage the bolt shaft on the other side of the flange, with the reaction washer positioned between the tightening head and the flange.

The reaction socket and lock ring can be secured to a power tool that also includes a drive mechanism secured to a drive socket. The lock ring can be rotated so that the locking fingers of the lock ring align with the reaction fingers of the reaction socket. Then, the power tool can be moved so that the drive socket fits over the tightening head while the reaction fingers and locking fingers slide into the finger spaces between the castles of the reaction washer. The lock ring can then be rotated so that the locking fingers slide into the locking spaces between the extension steps of the castles and the flange. In this position, the locking fingers can engage the castles to inhibit axial movement of the locking ring, the reaction socket, the power tool, and the drive socket away from the reaction washer and the tightening head.

Also, in this position, the outer edges of the outer row of teeth of the reaction washer and the backup washer can engage the flange, and the inner edges of the inner row of teeth of the reaction washer and the backup washer can engage the flange. Also, the tightening head can contact a summit of the head-facing surface of the reaction washer, while the opposing head can contact a summit of the head-facing surface of the backup washer.

The power tool can then be actuated to tighten the tightening head. As this happens, the clamping force can increase. Also, as this happens, the tightening head can tend to rotate the reaction washer in the same direction the tightening head is rotating, through friction. More significantly, the reaction force from the drive socket can generate a reaction force in the power tool, which is secured to the reaction socket, so that this rotational reaction force is transferred to the reaction washer via the reaction fingers of the reaction socket engaging the castles of the reaction washer. However, this rotational force on the reaction washer can be opposed by the outer teeth of the reaction washer engaging the flange. This can begin with the outer ends of the edges of the outer row of teeth engaging the flange. The inner ends of the edges of the inner row of teeth can also engage the flange, but the outer teeth can generate more resistance because they can be circumferentially slanted to dig into the flange to inhibit rotation of the reaction washer during tightening. Alternatively, the directions of slant for the inner and outer rows of teeth could be reversed, so the inner row would engage and provide more resistance during tightening.

Also, during tightening, forces transmitted from the tightening head via the bolt shaft to the opposing head can tend to rotate the opposing head along with the tightening head. Such forces can result in the opposing head engaging the backup washer with forces that tend to rotate the backup washer. Such forces can be opposed by the teeth in the outer row of the backup washer engaging the flange in a manner like the reaction washer. However, again, the directions of slant for the inner and outer rows of teeth could be reversed, so the inner row would engage the flange and provide more resistance during tightening for the backup washer. Thus, the backup washer can help to resist the tendency of the opposing head to rotate by increasing resistance to rotation between the opposing head and the flange.

As the tightening head continues to tighten, the clamping forces can gradually increase. As this happens, the teeth can dig deeper into the flange. Additionally, the reaction washer and the backup washer can each gradually collapse, which can gradually increase the contact area between the head-facing surfaces of the washers and the heads. The gradual collapsing of the washers can also increase the contact area between the teeth and the flange as the teeth gradually flatten out against the flange. As this flattening happens, matter that is trapped between the inner and outer rings of the engaging washers can be pushed along channels between the teeth toward the cavity between the rows of teeth, which can decrease the tendency of the material to inhibit the engagement between the washers and the flange.

Once the tightening head is sufficiently tightened, the power tool can be deactivated. The lock ring can be rotated so the locking fingers align with the reaction fingers, and the power tool, the drive socket, and the reaction socket can be axially pulled away from the reaction socket and the tightening head. There may still be some residual force between the tightening head and the reaction socket via the drive socket, the power tool, and the reaction socket. However, the decreased contact area due to differences in curvature between the reaction fingers and the castles can assist in decreasing the frictional forces as the reaction fingers are pulled away from the castles.

To loosen a bolt, the reaction socket and lock ring can be secured to a power tool that also includes a drive socket. The lock ring can be rotated so that the locking fingers of the lock ring align with the reaction fingers of the reaction socket. Then, the power tool can be moved so that the drive socket fits over the tightening head while the reaction fingers and locking fingers slide into the finger spaces between the castles of the reaction washer. The lock ring can then be rotated so the locking fingers slide into the locking spaces between the extension steps of the castles and the flange. As noted above, in this position the locking fingers can engage the castles to inhibit axial movement of the locking ring, the reaction socket, the power tool, and the drive socket away from the reaction washer and the tightening head.

The reaction washer and the backup washer can already be collapsed so that the outer row of teeth and the inner row of teeth of each are collapsed onto the flange, and the teeth are engaging the flange. Also, broad areas of the head-facing surfaces can contact the corresponding head.

The power tool can then be actuated to loosen the tightening head. As this happens, the clamping force can decrease. Also, as this happens, the tightening head can tend to rotate the reaction washer in the same direction the tightening head is rotating, through friction. More significantly, the reaction force from the drive socket can generate a reaction force in the power tool, which is secured to the reaction socket, so that this rotational reaction force is transferred to the reaction washer via the reaction fingers of the reaction socket engaging the castles of the reaction washer. However, this rotational force on the reaction washer can be opposed by the inner row of teeth of the reaction washer, which are already digging into the flange and engaging the flange. The outer row of teeth can also be engaging the flange, but the inner teeth can generate more resistance because they can be slanted to dig into the flange to inhibit rotation of the reaction washer during loosening. Alternatively, the directions of slant for the inner and outer rows of teeth could be reversed, so the outer row would engage and provide more resistance during tightening.

Also, during loosening, forces transmitted from the tightening head via the bolt shaft to the opposing head can tend to rotate the opposing head along with the tightening head. Such forces can result in the opposing head engaging the backup washer with forces that tend to rotate the backup washer. Such forces can be opposed by the teeth in the inner row of the backup washer engaging the flange in a manner like the reaction washer. However, again, the directions of slant for the inner and outer rows of teeth could be reversed, so the outer row would engage and provide more resistance during loosening for the backup washer. Thus, the backup washer can help to resist the tendency of the opposing head to rotate by engaging and increasing resistance to rotation between the opposing head and the flange.

As the tightening head continues to loosen, the clamping forces decrease. As this happens, the reaction washer and the backup washer can each gradually spring back toward their original positions prior to tightening, which can gradually decrease the contact area between the head-facing surfaces of the washers and the heads. The gradual springing back of the washers can also decrease the contact area between the teeth and the flange as the teeth gradually flatten out against the flange. However, there may have been some plastic deformation of the washers during tightening and/or material creep after tightening, so the washers may not spring back to their original shapes.

Once the tightening head is sufficiently loosened, the power tool can be deactivated. The lock ring can be rotated so the locking fingers align with the reaction fingers, and the power tool, the drive socket, and the reaction socket can be axially pulled away from the reaction socket and the tightening head.

III. Engaging Washer Features and Aspects

Some engaging washer features and aspects will now be described without including reference numbers corresponding to the reference numbers in the figures. The features and aspects may be used separately or in combination with each other in any different combination of features and/or aspects.

In one aspect, an engaging washer, which may be a backup washer or a reaction washer, can include an inner row of teeth extending around a central axis of the engaging washer, with the inner row of teeth including a plurality of teeth that each extends in a flange direction from a body of the engaging washer, with the flange direction being parallel to the central axis. The engaging washer can also include an outer row of teeth extending around the inner row of teeth, with the outer row of teeth including a plurality of teeth that each extends in the flange direction from the body of the engaging washer, and with the outer row of teeth being farther from the central axis of the engaging washer than the inner row of teeth.

The engaging washer can also include a bridge between the inner row of teeth and the outer row of teeth, with the bridge defining a cavity opening in the flange direction and extending around the inner row of teeth, and with the cavity being between the inner row of teeth and the outer row of teeth. A flange-facing surface of the engaging washer can define the inner row of teeth and the outer row of teeth. The flange-facing surface can slope in the flange direction away from the body of the engaging washer as the flange-facing surface extends radially outward from an outer side of the cavity. The flange-facing surface can also slope in the flange direction as the flange-facing surface extends radially inward from an inner side of the cavity.

The inner row of teeth can include teeth that are angled in a first circumferential direction as they extend in the flange direction away from the body of the engaging washer. The outer row of teeth can include teeth that are angled in a second circumferential direction as they extend in the flange direction from the body of the engaging washer, where the first circumferential direction is opposite the second circumferential direction.

The he inner row of teeth can include a row of wedges that each includes a distal edge extending in a radial direction relative to the axis of the engaging washer. Similarly, the outer row of teeth can each include a row of wedges that each includes a distal edge extending in a radial direction relative to the axis of the engaging washer.

With a force on the engaging washer causing the inner row of teeth and the outer row of teeth to bite into a clamped surface beneath the engaging washer, the inner row of teeth can be configured to provide greater resistance to rotation of the engaging washer in a first circumferential direction around the axis of the engaging washer than a second circumferential direction around the axis of the engaging washer, and the outer row of teeth can be configured to provide greater resistance to rotation of the engaging washer in the second circumferential direction around the axis of the engaging washer than in the first circumferential direction around the axis of the engaging washer, wherein the first circumferential direction is opposite the second circumferential direction.

In another aspect, an engaging washer can include an inner ring extending around a central axis of the engaging washer, with the inner ring being configured to contact a clamped surface. The engaging washer can also include a bridge extending around the inner ring, with the bridge defining a cavity configured to open toward the clamped surface, and with the cavity extending around the inner ring. The engaging washer can also include an outer ring extending around the bridge, with the outer ring being configured to contact the clamped surface. Additionally, the engaging washer can include engaging elements (such as the teeth or wedges discussed above) extending axially from the engaging washer and being configured to contact the clamped surface. The engaging elements may be different shapes—for example teeth can act as engaging elements whether those teeth are shaped as wedges, spikes, or some other engaging shape.

The inner ring, the bridge, and the outer ring can each be substantially circular. Also, the engaging washer can be configured so that when a clamping force is applied to press the engaging washer against the clamped surface, the engaging washer allows an initially raised portion of the inner ring to collapse onto the clamped surface without allowing the cavity to collapse onto the clamped surface, so that the cavity remains when the initially raised portion of the inner ring is collapsed onto the clamped surface. The engaging washer can be configured so that when the clamping force is applied to press the engaging washer against the clamped surface, the engaging washer allows the initially raised portion of the inner ring and an initially raised portion of the outer ring to collapse onto the clamped surface without allowing the cavity to collapse onto the clamped surface, so that the cavity remains raised away from the clamped surface when the initially raised portion of the inner ring and the initially raised portion of the outer ring are collapsed onto the clamped surface.

The inner ring can be configured to slope away from the clamped surface as it extends radially out toward the cavity, and the outer ring can be configured to slope away from the clamped surface as it extends radially in toward the cavity. The outer ring and the inner ring can each define channels that extend in radial directions toward the cavity. Also, the engaging washer can be configured so that when a clamping force is applied to press the engaging washer against the clamped surface, the inner ring forces material that is between the inner ring and the clamped surface to move outwardly toward the cavity. Additionally, the engaging washer can be configured so that when the clamping force is applied to press the engaging washer against the clamped surface, the outer ring forces material that is between the outer ring and the clamped surface to move inwardly toward the cavity.

In yet another aspect, an engaging washer can include an annular body forming a substantial arch extending in radial directions from an axis of the engaging washer. The annular body can include an annular head-facing surface facing substantially in a first axial direction, with the head-facing surface being substantially convex in radial directions extending from the axis of the engaging washer. The annular body can also include an annular flange-facing surface that faces substantially opposite to the head-facing surface, with the flange-facing surface being substantially concave in the radial directions extending from the axis of the engaging washer. Additionally, the engaging washer can include engaging elements extending away from the flange-facing surface.

The substantial arch can extend continuously around the annular body. Also, the annular head-facing surface can be a continuously curved convex surface.

The engaging washer can be configured so that when a clamping force is applied to press the engaging washer between a clamping surface and a clamped surface, with the clamping surface abutting the annular head-facing surface and the clamped surface abutting the flange-facing surface, a contact surface area of the head-facing surface that contacts the clamping surface gradually increases as a magnitude of the clamping force gradually increases. The engaging washer may also be configured so that when a clamping force is applied to press the engaging washer between a clamping surface and a clamped surface, with the clamping surface abutting the head-facing surface and the clamped surface abutting the flange-facing surface, a contact surface area of the flange-facing surface that contacts the clamped surface gradually increases as a magnitude of the clamping force gradually increases.

The engaging elements can include one or more rows of teeth extending around the flange-facing surface.

In yet another aspect, a reaction washer system can include a reaction washer. The reaction washer can include an annular body extending around an axis. The reaction washer can also include a plurality of castles extending radially out from an outer periphery of the annular body. Each of the castles can include a base step secured to the body and extending radially out from the body, with the base step having a flange-facing surface facing substantially in an axial flange direction. Each castle can also include an extension step secured to the base step and extending radially out from the base step. The extension step can have a flange-facing surface that is stepped relative to the flange-facing surface of the base step, with the flange-facing surface of the extension step facing substantially in the axial flange direction, so that the flange-facing surface of the base step is located axially offset in the flange direction and radially inward from the flange-facing surface of the extension step.

Each of the castles can include a continuous head-facing surface that extends along a head-facing surface of the base step and along a head-facing surface of the extension step, with the head-facing surfaces facing substantially opposite to the flange-facing surfaces. For each of the castles, the base step can be thicker than the extension step in the flange direction. Such a thicker base step can provide added rigidity to each castle, while the thinner extension step can allow space for a locking finger to engage the castle.

The reaction washer system can further include a reaction socket subsystem, which can include a plurality of fingers. The fingers can include one or more locking fingers extending along one or more flange-facing surfaces of the extension steps of the castles and inhibiting axial movement of the reaction socket subsystem away from the reaction washer. The fingers can also include one or more reaction fingers pressing circumferentially against one or more of the castles and inhibiting rotational movement of a reaction socket of the reaction socket subsystem relative to the reaction washer. The one or more locking fingers can extend along one or more of the flange-facing surfaces of the extension steps of the castles without extending along one or more of the flange-facing surfaces of the base steps of the castles. As discussed above, the one or more locking fingers can be configured to be fixed relative to the one or more reaction fingers. For example, a single combined finger may include a reaction finger and a locking finger, with the reaction finger and the locking finger being fixed to each other.

In yet another aspect, a reaction washer system can include a reaction washer. The reaction washer can include an annular body extending around an axis of the reaction washer. The reaction washer can also include a plurality of castles extending radially out from an outer periphery of the annular body. Each of the castles can include a circumferentially-facing contact surface that extends circumferentially away from a radial midline of the castle as the contact surface extends radially outward from the axis of the reaction washer.

For each of the castles, the circumferentially-facing surface can extend circumferentially toward the radial midline of the castle in a first portion and the circumferentially-facing surface and can extend circumferentially away from the radial midline of the castle in a second portion. The first portion can be closer to the annular body than the second portion.

For each of the castles, the circumferentially-facing surface can be a continuous concave surface. For example, the circumferentially-facing surface can be a substantially elliptically curved surface.

The reaction washer system can further include a reaction socket that can include a plurality of fingers each having a convex substantially elliptically curved circumferentially-facing surface that contacts a corresponding one of the circumferentially-facing surfaces of one of the castles of the reaction washer at a contact area. Each contact area can be a substantial line (which may be a straight line or a curved line) extending in an axial direction. Also, at each contact area, the corresponding circumferentially-facing surface of the one of the fingers at that contact area can have a greater convex curvature (e.g., a smaller radius of curvature) than a concave curvature of the circumferentially-facing surface of the one of the castles at that contact area.

In yet another aspect, a reaction washer system can include a reaction washer. The reaction washer can include an annular body extending around an axis of the reaction washer. The reaction washer can also include a plurality of castles extending radially out from an outer periphery of the annular body, with each of the castles including a circumferentially-facing surface. The reaction washer system can also include a reaction socket that can include a plurality of fingers each having a circumferentially-facing surface that contacts a corresponding one of the circumferentially-facing surfaces of one of the castles of the reaction washer at a contact area to form an abutting finger-castle pair, wherein the contact area can be substantially a line (such as a straight line or a curved line).

The contact area for each finger-castle pair can be substantially a line extending in an axial direction. For each of the fingers, the circumferentially-facing surface of the finger is a convex curved surface. Also, for each of the castles, the circumferentially-facing surface of the castle can be a concave curved surface.

For each of the fingers, the circumferentially-facing surface of the finger can be a convex substantially elliptically curved surface. Also, for each of the castles, the circumferentially-facing surface of the castle can be a substantially elliptical concave curved surface, and at each contact area, the corresponding circumferentially-facing surface of the one of the fingers at that contact area can have a greater convex curvature than a concave curvature of the circumferentially-facing surface of the one of the castles at that contact area.

In yet another aspect, a technique can include making a first engaging washer. The first engaging washer can include an inner row of teeth extending around a central axis of the first engaging washer, with the inner row of teeth including a plurality of teeth that each extends in a first axial flange direction away from a body of the first engaging washer. The first engaging washer can also include an outer row of teeth extending around the inner row of teeth of the first engaging washer, with the outer row of teeth including a plurality of teeth that each extends in the first axial flange direction away from the body of the first engaging washer. The first engaging washer can also include a bridge extending between the inner row of teeth and the outer row of teeth of the first engaging washer, with the bridge of the first engaging washer defining a cavity between the inner row of teeth and the outer row of teeth of the first engaging washer. The technique can also include making a second engaging washer. The second engaging washer can include an inner row of teeth extending around a central axis of the second engaging washer, with the inner row of teeth including a plurality of teeth that each extends in a second axial flange direction away from a body of the second engaging washer. The second engaging washer can also include an outer row of teeth extending around the inner row of teeth of the second engaging washer, with the outer row of teeth including a plurality of teeth that each extends in the second axial flange direction away from a body of the second engaging washer. The second washer can also include a bridge extending between the inner row of teeth and the outer row of teeth, with the bridge defining a cavity between the inner row of teeth and the outer row of teeth, with the cavity of the second engaging washer being deeper than the cavity of the first engaging washer. Shape and dimensions of the first engaging washer and the second engaging washer can be substantially the same except for differences in one or more of shape and dimensions between the cavity of the first engaging washer and the cavity of the second engaging washer.

A modulus of elasticity of material forming the first engaging washer can be greater than a modulus of elasticity of material forming the second engaging washer. The first engaging washer may include a first material having a first surface hardness and the second engaging washer can include a second material having a second surface hardness that is different from the first surface hardness.

In yet another aspect, a technique can include designing an engaging washer. The engaging washer can include an inner row of teeth extending around a central axis of the engaging washer, with the inner row of teeth including a plurality of teeth that each extends in an axial flange direction away from a body of the engaging washer. The engaging washer can also include an outer row of teeth extending around the inner row of teeth, with the outer row of teeth including a plurality of teeth that each extends in the flange direction away from the body of the engaging washer. Additionally, the engaging washer can include a bridge extending between the inner row of teeth and the outer row of teeth, with the bridge defining a cavity between the inner row of teeth and the outer row of teeth. The designing of the engaging washer can include adjusting a resistance of the engaging washer to being compressed by adjusting a depth of the cavity to a final depth. The technique can further include making the engaging washer with the cavity having the final depth.

The engaging washer can be a first engaging washer and the final depth can be a first final depth. The technique can further include designing a second engaging washer. The second engaging washer can include an inner row of teeth extending around a central axis of the second engaging washer, with the inner row of teeth including a plurality of teeth that each extends in an axial flange direction away from a body of the second engaging washer. The second engaging washer can also include an outer row of teeth extending around the inner row of teeth of the second engaging washer, with the outer row of teeth of the second engaging washer including a plurality of teeth that each extends in the axial flange direction away from the body of the second engaging washer. Additionally, the second engaging washer can include a bridge extending between the inner row of teeth of the second engaging washer and the outer row of teeth of the second engaging washer, with the bridge defining a cavity between the inner row of teeth and the outer row of teeth of the second engaging washer. The designing of the second engaging washer can include adjusting a resistance of the second engaging washer to being compressed by adjusting a depth of the cavity of the second engaging washer to a second final depth, with the second final depth being different from the first final depth. The technique can further include making the second engaging washer with the cavity having the second final depth.

In yet another aspect, a backup washer can include an annular body extending around a central axis of the backup washer. The backup washer can also include a plurality of teeth circumferentially spaced around a flange-facing surface of the annular body, with each of the plurality of teeth extending from the annular body in a flange direction. Additionally, the reaction washer can include a head-facing surface opposite to the flange-facing surface, with the head-facing surface having engaging texturing features formed therein.

The texturing features can include slots formed in the head-facing surface. The slots can extend in radial directions. Also, the head-facing surface can form plateaus between the slots. Moreover, the plateaus can have head-facing surfaces that are convexly curved in radial directions. Also, the plateaus can have head-facing surfaces that are convexly curved in radial directions.

While the invention has been particularly shown and described with reference to preferred embodiments thereof, it will be understood by those skilled in the art that various changes in form and details may be made therein without departing from the spirit and scope of the invention.

I claim:

1. An engaging washer comprising:
an inner row of teeth extending around a central axis of the engaging washer, with the inner row of teeth comprising a plurality of teeth that each extends in a flange direction from a body of the engaging washer, with the flange direction being parallel to the central axis, the inner row of teeth comprising teeth that are angled in a first circumferential direction as they extend in the flange direction away from the body of the engaging washer; and
an outer row of teeth extending around the inner row of teeth, with the outer row of teeth comprising a plurality of teeth that each extends in the flange direction from the body of the engaging washer, and with the outer row of teeth being farther from the central axis of the engaging washer than the inner row of teeth, the outer row of teeth comprising teeth that are angled in a second circumferential direction as they extend in the flange direction from the body of the engaging washer, the first circumferential direction being opposite the second circumferential direction.

2. The engaging washer of claim 1, further comprising a bridge between the inner row of teeth and the outer row of teeth, with the bridge defining a cavity opening in the flange direction and extending around the inner row of teeth, and with the cavity being between the inner row of teeth and the outer row of teeth.

3. The engaging washer of claim 2, wherein a flange-facing surface of the engaging washer defines the inner row of teeth and the outer row of teeth, wherein the flange-facing surface slopes in the flange direction away from the body of the engaging washer as the flange-facing surface extends radially outward from an outer side of the cavity and wherein the flange-facing surface slopes in the flange direction as the flange-facing surface extends radially inward from an inner side of the cavity.

4. The engaging washer of claim 1, wherein the inner row of teeth comprises a row of wedges that each comprises a distal edge extending in a radial direction relative to the central axis of the engaging washer, and wherein the outer row of teeth each comprises a row of wedges that each comprises a distal edge extending in a radial direction relative to the central axis of the engaging washer.

5. The engaging washer of claim 1, wherein, with a force on the engaging washer causing the inner row of teeth and the outer row of teeth to bite into a clamped surface beneath the engaging washer, the inner row of teeth are configured to provide greater resistance to rotation of the engaging washer in a first circumferential direction around the central axis of the engaging washer than a second circumferential direction around the central axis of the engaging washer, and the outer row of teeth are configured to provide greater resistance to rotation of the engaging washer in the second circumferential direction around the central axis of the engaging washer than in the first circumferential direction around the central axis of the engaging washer, wherein the first circumferential direction is opposite the second circumferential direction.

6. An engaging washer comprising:
   an inner ring extending around a central axis of the engaging washer, with the inner ring being configured to contact a clamped surface;
   a bridge extending around the inner ring, with the bridge defining a cavity configured to open toward the clamped surface, and with the cavity extending around the inner ring;
   an outer ring extending around the bridge, with the outer ring being configured to contact the clamped surface; and
   engaging elements extending axially from the engaging washer and being configured to contact the clamped surface, the engaging elements comprising:
      an inner row of teeth around the inner ring, the inner row of teeth comprising teeth that are angled in a first circumferential direction as they extend in a flange direction away from a body of the engaging washer; and
      an outer row of teeth around the outer ring, the outer row of teeth comprising teeth that are angled in a second circumferential direction as they extend in the flange direction from the body of the engaging washer, the first circumferential direction being opposite the second circumferential direction.

7. The engaging washer of claim 6, wherein the inner ring, the bridge, and the outer ring are each substantially circular.

8. The engaging washer of claim 6, wherein the engaging washer is configured so that when a clamping force is applied to press the engaging washer against the clamped surface, the engaging washer allows an initially raised portion of the inner ring to collapse onto the clamped surface without allowing the cavity to collapse onto the clamped surface, so that the cavity remains when the initially raised portion of the inner ring is collapsed onto the clamped surface.

9. The engaging washer of claim 8, wherein the engaging washer is configured so that when the clamping force is applied to press the engaging washer against the clamped surface, the engaging washer allows the initially raised portion of the inner ring and an initially raised portion of the outer ring to collapse onto the clamped surface without allowing the cavity to collapse onto the clamped surface, so that the cavity remains raised away from the clamped surface when the initially raised portion of the inner ring and the initially raised portion of the outer ring are collapsed onto the clamped surface.

10. The engaging washer of claim 6, wherein the inner ring is configured to slope away from the clamped surface as it extends radially out toward the cavity, and wherein the outer ring is configured to slope away from the clamped surface as it extends radially in toward the cavity.

11. The engaging washer of claim 10, wherein the outer ring and the inner ring each define channels that extend in radial directions toward the cavity.

12. The engaging washer of claim 6, wherein the engaging washer is configured so that when a clamping force is applied to press the engaging washer against the clamped surface, the inner ring forces material that is between the inner ring and the clamped surface to move outwardly toward the cavity.

13. The engaging washer of claim 12, wherein the engaging washer is configured so that when the clamping force is applied to press the engaging washer against the clamped surface, the outer ring forces material that is between the outer ring and the clamped surface to move inwardly toward the cavity.

* * * * *